(12) United States Patent
Bischoff et al.

(10) Patent No.: US 12,140,479 B2
(45) Date of Patent: Nov. 12, 2024

(54) METHOD AND SYSTEM FOR QUANTIFYING A SPECTRAL SIMILARITY BETWEEN A SAMPLE COLOR AND A TARGET COLOR

(71) Applicant: BASF Coatings GmbH, Münster (DE)

(72) Inventors: Guido Bischoff, Muenster (DE); Florian Steufmehl, Muenster (DE)

(73) Assignee: BASF COATINGS GMBH, Muenster (DE)

( * ) Notice: Subject to any disclaimer, the term of this patent is extended or adjusted under 35 U.S.C. 154(b) by 366 days.

(21) Appl. No.: 17/632,801

(22) PCT Filed: Aug. 1, 2020

(86) PCT No.: PCT/EP2020/071750
§ 371 (c)(1),
(2) Date: Feb. 4, 2022

(87) PCT Pub. No.: WO2021/023684
PCT Pub. Date: Feb. 11, 2021

(65) Prior Publication Data
US 2022/0283031 A1    Sep. 8, 2022

(30) Foreign Application Priority Data
Aug. 6, 2019 (EP) .................................. 19190388

(51) Int. Cl.
*G01J 3/46* (2006.01)
*G06V 10/56* (2022.01)
(Continued)

(52) U.S. Cl.
CPC .............. *G01J 3/463* (2013.01); *G01J 3/462* (2013.01); *G06V 10/56* (2022.01); *G06V 10/60* (2022.01); *G01N 21/00* (2013.01)

(58) Field of Classification Search
CPC ............ G01J 3/463; G01J 3/462; G01J 3/504; G06V 10/56; G06V 10/60
See application file for complete search history.

(56) References Cited

U.S. PATENT DOCUMENTS

| | | | |
|---|---|---|---|
| 5,841,421 A * | 11/1998 | Cheetam ................. | G01J 3/50 356/402 |
| 2013/0201476 A1 * | 8/2013 | Beymore ................ | G01J 3/463 356/408 |
| 2016/0005187 A1 * | 1/2016 | Prakash ............. | G01N 21/4738 356/402 |

FOREIGN PATENT DOCUMENTS

WO    2014134099 A1    9/2014

OTHER PUBLICATIONS

Tiwari, V. (2015). Simulation of Hyperspectral Data from Multispectral Data Using Spectral Reconstruction Approach [Master's thesis, Andhra University, Visakhapatnam]. Indian Institute of Remote Sensing. https://hindi.iirs.gov.in/iirs/sites/default/files/StudentThesis/VARUN_MTech_2013-15.pdf (Year: 2015).*

(Continued)

*Primary Examiner* — Michelle M Iacoletti
*Assistant Examiner* — Judy Dao Tran
(74) *Attorney, Agent, or Firm* — Armstrong Teasdale LLP

(57) ABSTRACT

Described herein is a computer-implemented method and a system for providing a match metric for quantifying a spectral similarity of a target coating and at least one sample coating, the system including a computing device that performs a computing process, the computing process including: receiving reflectance values of the target coating and the sample coating; normalizing each of the reflectance values; generating a normalized reflectance curve for the target coating and for the sample coating; producing derivative values of the normalized reflectance curve of the target coating and derivative values of the normalized reflectance (Continued)

curve of the sample coating with respect to the wavelength; producing difference values between the derivative values of the target coating and the derivative values of the sample coating; and producing a match metric for a similarity between the normalized reflectance curves of the target coating and the sample coating.

12 Claims, 18 Drawing Sheets

(51) Int. Cl.
      *G06V 10/60*     (2022.01)
      *G01N 21/00*     (2006.01)

(56) References Cited

OTHER PUBLICATIONS

Viole, Non-Linear Scaling Normalization with Variance Retention, Aug. 2013, SSRN, Abstract (Year: 2013).*
International Search Report and Written Opinion for corresponding PCT/EP2020/071750 mailed Nov. 26, 2020, 11 Pages.
Fuan Tsai et al, "Derivative Analysis of Hyperspectral Data", Remote Sensing of Environment., vol. 66, No. 1, Oct. 1, 1998 (Oct. 1, 1998), p. 41-51.

* cited by examiner

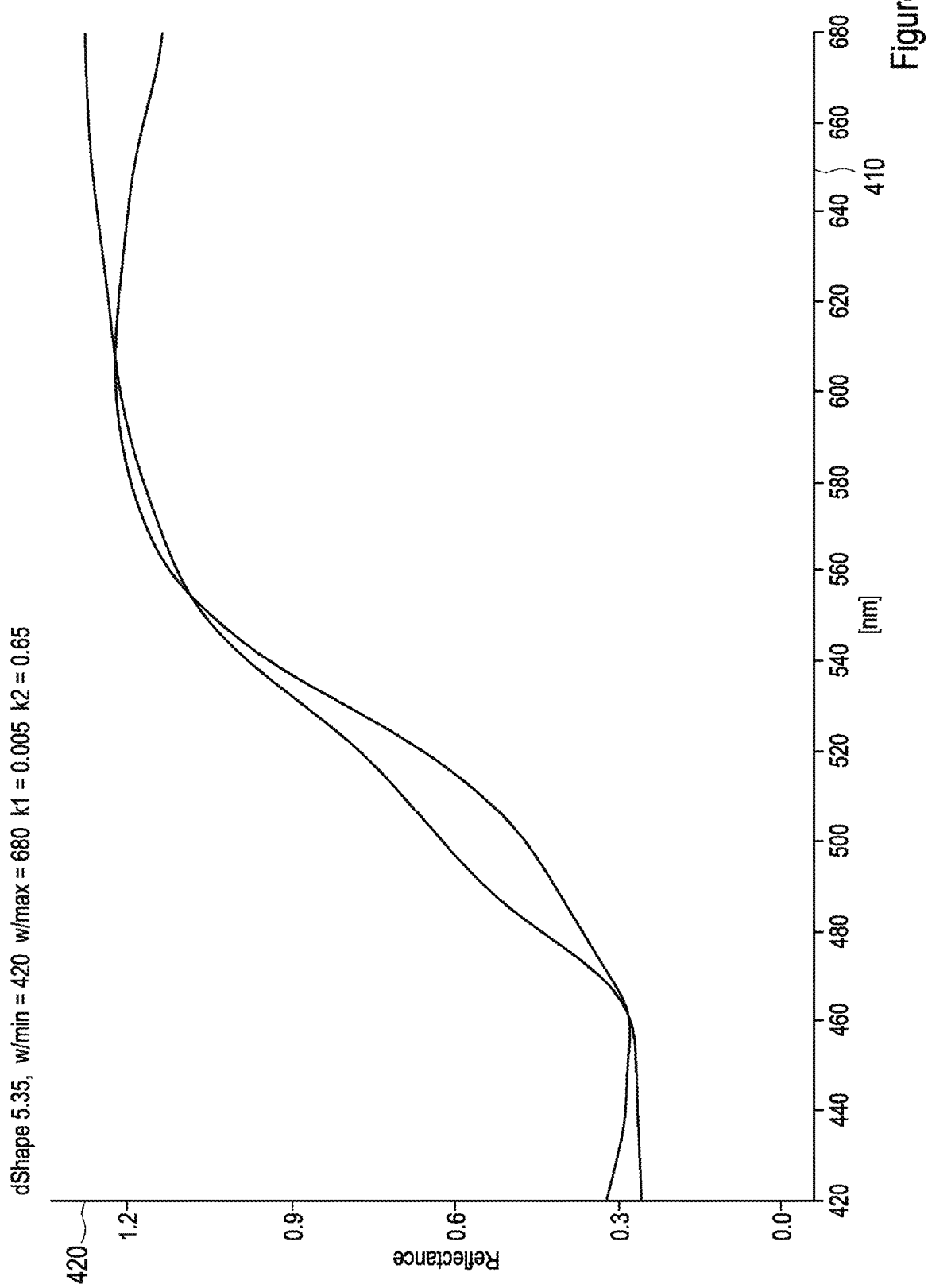

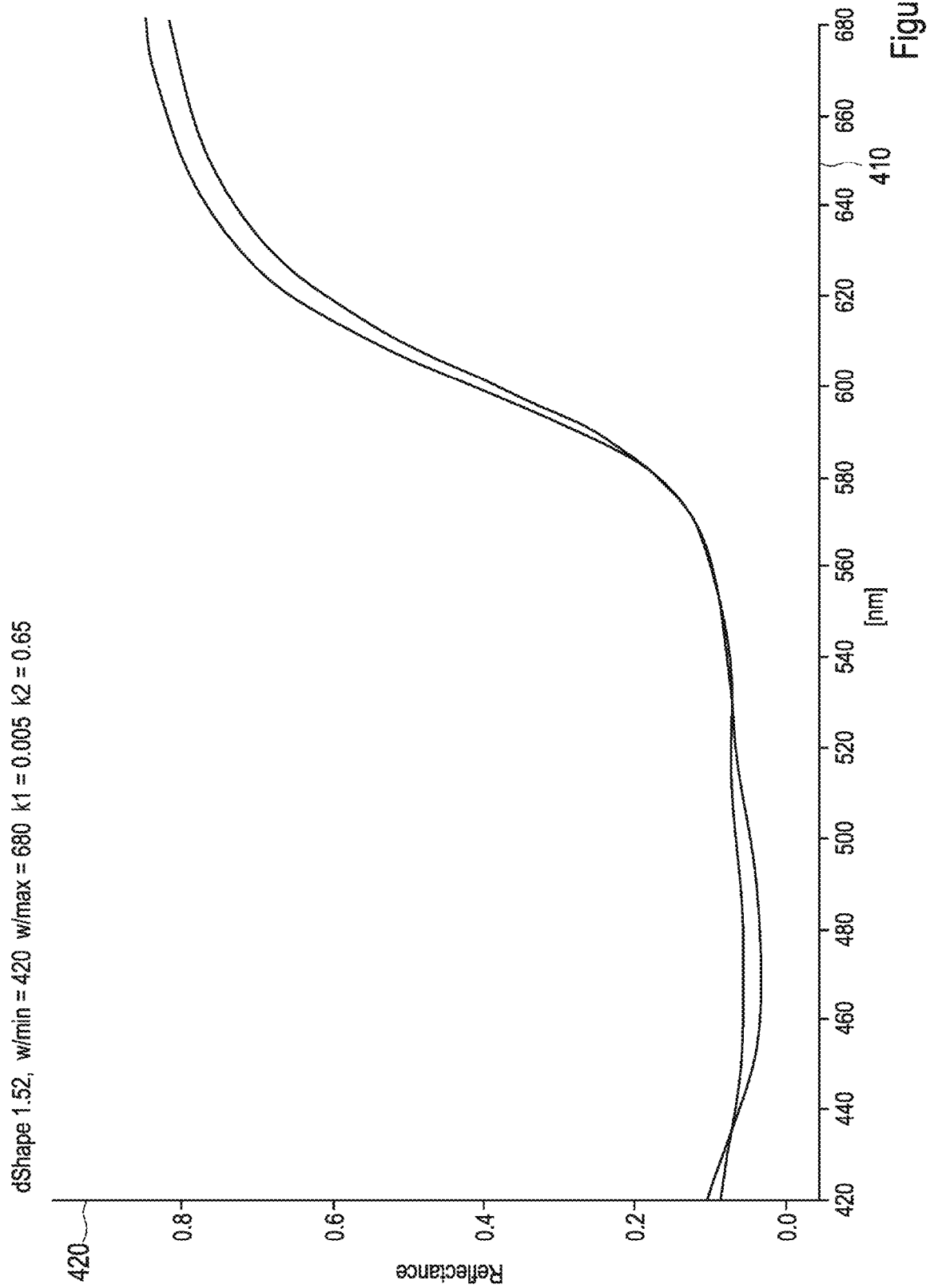

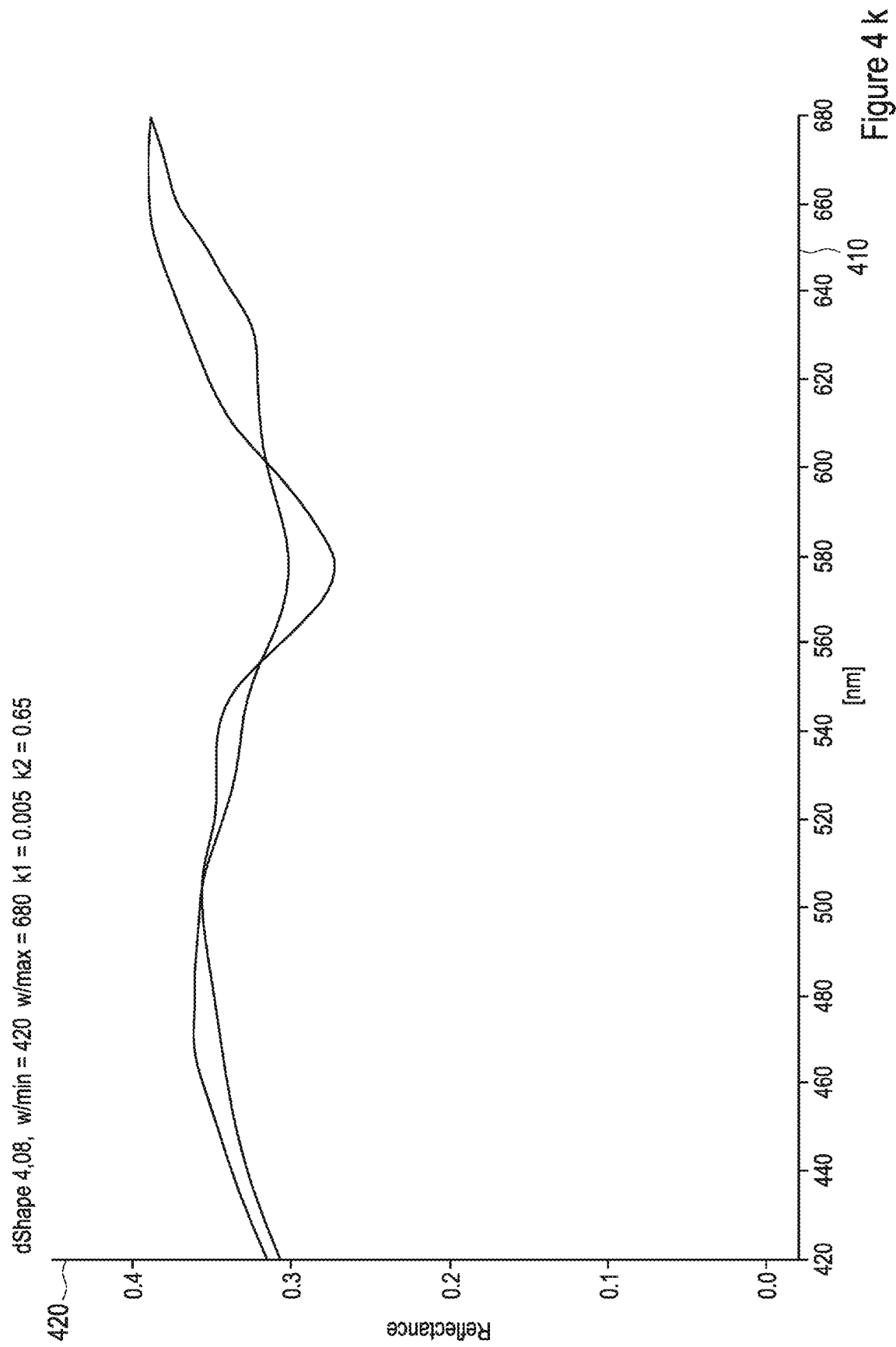

METHOD AND SYSTEM FOR QUANTIFYING A SPECTRAL SIMILARITY BETWEEN A SAMPLE COLOR AND A TARGET COLOR

FIELD OF THE INVENTION

The present disclosure refers to a method and a system for providing a match metric for quantifying a spectral similarity between at least one sample coating and a target coating.

BACKGROUND

Generally, specifications of tinting bases are determined by using reference colors defined/expressed within the CIELab* color space (also known as CIE L*a*b* color space). The CIELab* color space is a color space defined by the International Commission on Illumination (CIE) in 1976 which expresses color as three values L*, a* and b*. In practice, the space is usually mapped onto a three-dimensional integer space for digital representation, and thus the L*, a* and b* values are usually absolute, with a pre-defined range. L* stands for the lightness wherein the L* axis represents black at L*=0 and white at L*=100, the a* axis ranges from green (negative axis) to red (positive axis), and the b* axis ranges from blue (negative axis) to yellow (positive axis).

In order to compare and/or adjust a sample color with a target color, a color difference dE* in the CIELab* color space can be used, wherein the color difference dE* is defined by:

$$dE^* = \sqrt{dL^{*2} + da^{*2} + db^{*2}} \quad (1)$$

However, a formula with a small color difference dE*, see formula (1), can not guarantee that a pigmentation, i.e. a pigment combination used in the target color can be exactly adjusted. In order to reproduce a pigmentation of a target color, a detailed characterization of tinting bases by means of a spectral analysis is needed. Thereby, spectral curves are determined based on reflectance values measured at different wavelength values, e.g. in the range from 400 nm to 700 nm. Furthermore, spectral curves are captured for different measurement geometries, i.e. at different viewing angles and/or with different illumination angles. However, a mere visual look at such spectral curves is not sufficient to identify similarities and differences between the target color and the sample color. Up to now, an identification of a pigmentation of a target color is time-consuming and costly so that the process is often reduced to a mere approximation of color coordinates within the CIELab* color space.

Therefore, it is an object of the present disclosure to provide a possibility to quantify a spectral similarity between a sample color, in the following also called sample coating, and a target color, in the following also called target coating.

SUMMARY OF THE INVENTION

The present disclosure provides a system and a method with the features of the independent claims. Embodiments are subject of the dependent claims and the description and drawings.

Today, a color matching and adjustment process is based on digital color measurements taken with a multi-angle spectrometer, e. g. a Byk-Mac® I or a spectrometer of the XRite MA®-T-family. Reflectance of a color coating is measured from several geometries (illumination and observation directions/angles). Typical measure geometries are a fixed illumination angle at 45° measured relative to the surface normal of the coating and viewing angles of −15°, 15°, 25°, 45°, 75°, 110°, each measured relative to the specular angle, i. e. the specular direction, the specular direction being defined as the outgoing direction that makes the same angle with the normal of the color coating surface as the incoming direction of the respective light ray. It is also possible to keep the viewing angle constant and to vary the illumination angle.

A known basic structure of the color matching and adjustment process comprises the following steps:
1. Measure spectral (reflectance) curves of a target color, i. e. a target coating (spectral curves).
2. Measure spectral (reflectance) curves of a sample color, i. e. a sample coating (spectral curves).
3. Compute color values of the target color and the sample color, i. e. of the target coating and the sample coating, wherein the respective coating is described in CIELab* color space (Lab* or LCh* values).
4. Determine a metric for the "cost function", e. g. an accumulated color difference metric between target and sample color, i. e. target and sample coating for all geometries, e. g. CIE dE*, see formula (1).
5. Modify a formulation of the sample coating so that the color difference metric ("cost function") is minimized (typically done by a color matching algorithm).

However, as mentioned before, it is often not sufficient to perform a matching process only on the basis of the color difference, i. e. using the color difference metric, as the pigmentation of the sample coating might still deviate from the pigmentation of the target coating in an unacceptable manner. Thus, it would be desirable to provide a further metric that supplements the already existing metrics such as the color difference metric, in order to account sufficiently for the pigmentation of a target coating.

The present disclosure provides, according to claim 1, a computer-implemented method for providing a match metric for quantifying a similarity of spectral curves of a target coating and at least one sample coating, the method comprising at least the steps of:

a) obtaining, via a communications interface, for a number of wavelength values, reflectance values of the target coating and reflectance values of the sample coating, wherein the reflectance values of the target coating are determined at one or more measurement geometries, particularly measured at one or more measurement geometries, and the reflectance values of the sample coating are determined at the one or more measurement geometries, particularly measured at the one or more measurement geometries;

and by at least one processor:

b) normalizing each of the reflectance values of the target coating determined at the respective one or more measurement geometries, e. g. measured at the respective one or more measurement geometries, and the reflectance values of the sample coating determined at the respective one or more measurement geometries, e. g. measured at the respective one or more measurement geometries, by using a scaling function, particularly a non-linear scaling function;

c) generating a normalized reflectance curve for the target coating based on the normalized reflectance values of the target coating for each wavelength value, and a normalized reflectance curve for the sample coating based on the normalized reflectance values of the sample coating for each wavelength value;

d) producing, for the number of wavelength values, normalized first derivative values of the normalized reflectance curve of the target coating with respect to the wavelength and normalized first derivative values of the normalized reflectance curve of the sample coating with respect to the wavelength;

e) producing, for each wavelength value of the number of wavelength values, difference values between the normalized first derivative values of the normalized reflectance curve of the target coating and the normalized first derivative values of the normalized reflectance curve of the sample coating;

f) producing a match metric for the similarity between the normalized reflectance curves of the target coating and the sample coating based on the difference values for all of the number of wavelength values, and g) outputting, using an output device, the produced match metric for a user.

According to a further aspect of the present disclosure, the method further comprises the step of:

h) modifying an initial formulation of the sample coating so as to minimize the match metric for the similarity of the spectral curves between the target coating and the sample coating as constraint (beside the existing color difference metric(s)).

According to still a further aspect, the initial formulation of the sample coating is retrieved as one of one or more preliminary matching formulations from a database which comprises coating formulations and interrelated color characteristics such as L*, a*, b* values and optionally texture characteristics such as sparkle values or coarseness values. That means that starting from the target coating, it is first searched in the database for one or more preliminary matching formulations whose color and optionally texture data are equal or at least similar to those of the target coating, i. e. the color differences and optionally the texture differences between the one or more preliminary matching formulations and the target coating are minimal using a color and optionally texture matching algorithm.

That means that the initial formulation/formula of the sample coating can be pre-given or can be selected from a formulation database comprising formulations for coating compositions and interrelated appearance data. "Appearance" as used herein refers to the visual experience/perception by which a coating is viewed or recognized. Thus, appearance can include color, shape, texture, sparkle, glitter, gloss, transparency, opacity and other visual effects of a coating, or a combination thereof. "Modifying" comprises admixing one or more components to the initial formula and/or omitting one or more components from the initial formula and/or changing a respective concentration/amount of one or more components of the initial formula, thus, obtaining a modified formula which better matches the target color regarding its appearance which can be expressed by different metrics, such as the color difference metric and the spectral similarity expressed by the match metric as disclosed herein.

The term "spectral similarity" between the sample coating and the target coating is to be understood as similarity between a shape of the spectral (reflectance) curve of the sample coating and a shape of the spectral (reflectance) curve of the target coating.

The proposed method provides a match metric in order to characterise a spectral similarity between two reflectance curves. A value of the match metric serves as a means to quantify a similarity between a pigmentation of a target coating and a pigmentation of a sample coating. Furthermore, all possible values of the match metric lie in a range of a scale that corresponds or is at least comparable to those scales which are used for other metrics used in a color matching process, such as the already mentioned color difference metric dE* defined in the CIELab* color space. Smaller values of the match metric represent a better spectral similarity and higher values of the match metric represent a worse spectral similarity between the two considered reflectance curves.

A low spectral similarity metric indicates that the pigmentation of the formulation of the sample coating is not the same as the pigmentation which was used for the target coating. That means that the pigmentation of the sample coating is not optimal in order to match the target coating.

A reflectance curve, in the following also called spectral curve, describes in the scope of the present disclosure a reflectance behaviour of a coating at different wavelength values and at a specific measure geometry. For each measure geometry, a separate reflectance curve is to be determined, e.g. measured. In the scope of the present disclosure, the terms "measure geometry" and "measurement geometry" are used synonymously.

In the scope of the present disclosure, the term "sample coating" designates a color, i.e. a paint layer that has been prepared according to a sample formula and coated on a surface. The term "target coating" designates a color, i.e. a paint layer coated on a surface whose underlying formula is unknown and which should to be replicated as best as possible.

According to one possible embodiment of the proposed method, step d) further comprises:

d2) transforming the normalized first derivative values of the normalized reflectance curve of the target coating and of the sample coating, respectively, with respect to the wavelength, into an angular representation.

According to one embodiment of the proposed method the normalized first derivative values of the normalized reflectance curve of the target coating and of the sample coating, respectively, are represented, for each wavelength value as a two-dimensional vector according to the following formulas:

$$u_{\lambda_i} = \begin{pmatrix} k_1 \cdot \Delta\lambda_i \\ \Delta R_{ref,\lambda_i}^{norm} \end{pmatrix}$$

$$v_{\lambda_i} = \begin{pmatrix} k_1 \cdot \Delta\lambda_i \\ \Delta R_{smp,\lambda_i}^{norm} \end{pmatrix}$$

$$\theta_{\lambda_i} = \cos^{-1}\left(\frac{u_{\lambda_i} \cdot v_{\lambda_i}}{|u_{\lambda_i}| \cdot |v_{\lambda_i}|}\right)$$

with $\Delta R_{ref,\lambda_i}^{norm} = R_{ref,\lambda_i+\Delta\lambda_i}^{norm} - R_{ref,\lambda_i}^{norm}$, and $\Delta R_{smp,\lambda_i}^{norm} = R_{smp,\lambda_i+\Delta\lambda_i}^{norm} - R_{smp,\lambda_i}^{norm}$, and $\Delta\lambda_i = \lambda_{i+1} - \lambda_i$, wherein $R_{ref,\lambda_i}^{norm}$ indicates a normalized reflectance value of the target coating at the wavelength value $\lambda_i$, $R_{ref,\lambda_i+\Delta\lambda_i}^{norm}$ indicates a normalized reflectance value of the target coating at the wavelength value $\lambda_{i+1}$, $R_{smp,\lambda_i}^{norm}$ indicates a normalized reflectance value of the sample coating at the wavelength value $\lambda_i$, $R_{smp,\lambda_{i+1}}^{norm}$ indicates a normalized reflectance value of the sample coating at the wavelength value $\lambda_{i+1}$, $k_1$ is a non-linear damping parameter with, for example, $k_1=0.005$ and $\theta_{\lambda_i}$ indicates the angle between the two normalized vectors $u_{\lambda_i}$ and $v_{\lambda_i}$, the vector $u_{\lambda_i}$ indicating a normalized gradient of the reflectance curve of the target coating at $\lambda_i$ and the vector $v_{\lambda_i}$ indicating a normalized gradient of the reflectance curve of the sample coating at $\lambda_i$. Thus, $\theta_{\lambda_i}$ indicates a kind of normalized difference value/angle between both spectral curves at the wavelength value $\lambda_i$.

According to one aspect, the wavelength values of the number of wavelength values are chosen from an interval from a minimum wavelength value to a maximum wavelength value, with the minimum wavelength value being about 420 nm and the maximum wavelength value being about 680 nm, i.e.:

$$\lambda_i = \lambda_{min}, \ldots, \lambda_{max}$$

$$\lambda_{min} \approx 420 \text{ nm}$$

$$\lambda_{max} \approx 680 \text{ nm}$$

wherein the number of measured reflectance values between $\lambda_{min}$ and $\lambda_{max}$ is n and the index of the respective reflectance values $i \in [0, \ldots (n-1)]$.

As the human eye operates particularly in the range from 400 nm to 700 nm, this range of wavelength values is highly relevant. The spectral range lower than 420 nm can be excluded from analysis because of measurement uncertainty caused by additives in coatings like e. g. UV-blockers. The spectral range higher than 680 nm can be excluded from analysis because of limitations of paint layers regarding hiding power and resulting interferences with the substrate color.

The proposed match metric allows to identify differences between a target coating and a sample coating, even if the color associated with the target coating and the color associated with the sample coating lie on the same point or on adjacent points in the CIELab* space. Thus, a non-optimal pigmentation with resulting metamerism effect can be considered and identified.

The normalized spectral reflectance curve of the target coating is given/defined by the normalized reflectance values $R_{ref,\lambda_i}^{norm}$.

The normalized spectral reflectance curve of the sample coating is given/defined by the normalized reflectance values $R_{smp,\lambda_i}^{norm}$.

For the purpose of comparison, the reflectance values are normalized by a scaling function which is chosen as a non-linear scaling function $f_{ref,smp}$, particularly as follows:

$$f_{ref/smp} = \frac{1}{Norm_{R_{ref/smp}}}$$

with $$Norm_{R_{ref/smp}} = \frac{116 \cdot x_{ref/smp} - 16}{100}$$

with $$x_{ref/smp} = \begin{cases} \sqrt[3]{R_{ref/smp,center}}, & R_{ref/smp,center} > \frac{216}{24389} \\ \frac{\frac{24389}{27} R_{ref/smp,center} + 16}{116}, & \text{otherwise} \end{cases}$$

wherein $R_{ref/smp,center}$ is given by:

$$R_{ref/smp,center} = R_{ref/smp,min} + \frac{R_{ref/smp,max} - R_{ref/smp,min}}{2}$$

with $$R_{ref/smp,max} = \text{Max}(R_{ref/smp,\lambda_i}) \text{ and } R_{ref/smp,min} = \text{Min}(R_{ref/smp,\lambda_i})$$

wherein $R_{ref/smp,\lambda_i}$ designates both, $R_{ref,\lambda_i}$ and $R_{smp,\lambda_i}$, wherein $R_{ref,\lambda_i}$ is the reflectance value of the target coating at the wavelength value $\lambda_i$ and $R_{smp,\lambda_i}$ is the reflectance value of the sample coating at the wavelength value $\lambda_i$.

The non-linear scaling function $f_{ref,smp}$ is referring to the luminance (L*) algorithm for the conversion of colors from the XYZ color space into the CIELab* color space. The L* metric is intended to mimic the logarithmic response for lightness of the human eye. The scaling function attempts to linearize the perceptibility of lightness.

According to one aspect of the proposed method, the match metric which is called in the following dShape, is chosen as follows:

$$dShape = k_2 \cdot \frac{31}{n} \cdot \sum_{i=0}^{n-2} \theta_{\lambda_i}$$

wherein n is an integer and $k_2$ is a linear scaling factor with, for example, $k_2 = 0.65$.

According to a further aspect of the proposed method, the match metric is chosen as follows:

$$dShape^* = k_2^* \cdot \frac{31}{n} \cdot \sum_{i=0}^{n-2} \frac{|\Delta R_{smp,\lambda_i}^{norm} - \Delta R_{ref,\lambda_i}^{norm}|}{k_1 \cdot \Delta \lambda_i}$$

wherein n is an integer and $k_2^*$ is a linear scaling factor with, for example, $k_2^* = 100$.

The parameter $k_1$ and the parameters $k_2$, $k_2^*$ are freely selectable so as to define together (see formulas described above) the scale for the first match metric value dShape, dShape*.

The proposed method provides a match metric that yields values in a scale, i.e. a scale space that is comparable to the scale space of the CIELab* color space and of color distance metrics which are defined in the CIELab* color space like e. g. the lightness difference metric dL* and the color difference metric dE*. Thus, all colorimetric data which is defined in this standard color space and which is usable in a color matching, adjusting and searching process can be provided in comparable scales, so that an interpretation of the colorimetric data in an overall view is facilitated. Due to the scaling function the gained values of the match metric can be interpreted regardless of the absolute color coordinates of the target coating, in particular regardless of its lightness L*.

Generally, it is intended to determine a formula retrieved from a database, whose color difference dE*, optionally also whose texture difference, whose sparkle difference dS and whose graininess difference dG, and whose newly calculated match metric dShape are minimal when all metrics are considered separately, i.e. on its own.

A further correction/modification of the best matching formula is performed using a cost function which combines all those considered metrics, e. g. by adding all considered metrics together: dE* (or dL*+da*+db*)+dShape (optionally: +dS+dG+ . . . ), probably each summand being weighted appropriately, and minimizing such cost function accordingly.

Alternatively, it is also possible not to preselect a preliminary matching formula from a database, but to directly calculate a best matching formula using such a cost function which combines the different metrics, i.e. to calculate a best matching formula from scratch.

According to a further embodiment of the proposed method, the at least one measurement geometry is chosen from the group comprising −15°, 15°, 25, 45°, 75° and 110°, each measured relative to the specular angle.

Particularly, the characteristic information about the pigmentation in paint, i.e. in the target coating and the sample coating, respectively, is included in a respective shape of the measured spectral curves, particularly of the measured reflectance curves. In the scope of the present disclosure, the terms "spectral curve", "spectral reflectance curve" and "reflectance curve" are used synonymously. Pigments have typical absorption and scattering characteristics which produce characteristic fingerprints in the spectral curves. For the analysis of the required/optimal pigmentation for a target color, the absolute intensities of the reflectance values are less important than the shape of the reflectance/spectral curve, which can be encoded by the first derivate values of the normalized spectral curve.

According to the present disclosure, a useful metric is the difference, i.e. the difference values, between the normalized first derivate (values) of the respective normalized spectral curves of the target coating and the sample coating. This match metric includes information about the shape of the spectral curves and it does not include information about the absolute intensity of the reflectance values.

The strategy to use the normalized first derivate (values) of respective normalized spectral curves as match metric can also be combined, as mentioned above, with other metrics in the field of color searching, matching and adjustment, e. g. with color difference metric and optionally texture difference metric.

The present disclosure further refers to a system for providing a match metric for quantifying a similarity of spectral curves of a target coating and at least one sample coating, the system comprising:
A) a computing device;
B) a computer program product, the computer program product comprises computer executable codes stored on a computer-readable storage medium functionally coupled to the computing device and causes the computing device to perform a computing process when in operation, the computing process comprises the steps of:
B1) receiving, via a communications interface, for a number of wavelength values, reflectance values of the target coating and reflectance values of the sample coating, wherein the reflectance values of the target coating are determined, particularly measured, at one or more measurement geometries, and the reflectance values of the sample coating are determined, particularly measured, at the one or more measurement geometries;
B2) normalizing each of the reflectance values of the target coating determined at the respective one or more measurement geometries and the reflectance values of the sample coating determined at the respective one or more measurement geometries by using a non-linear scaling function;
B3) generating a normalized reflectance curve for the target coating based on the normalized reflectance values of the target coating for each wavelength value, and a normalized reflectance curve for the sample coating based on the normalized reflectance values of the sample coating for each wavelength value;
B4) producing, for the number of wavelength values, normalized first derivative values of the normalized reflectance curve of the target coating with respect to the wavelength and normalized first derivative values of the normalized reflectance curve of the sample coating with respect to the wavelength;
B5) producing, for each wavelength value of the number of wavelength values, difference values between the normalized first derivative values of the normalized reflectance curve of the target coating and the normalized first derivative values of the normalized reflectance curve of the sample coating;
B6) producing a match metric for the similarity of the normalized reflectance curves of the target coating and the sample coating based at least on the difference values for all of the number of wavelength values, and
B7) outputting, using an output device, the produced match metric to a user.

According to a possible embodiment of the proposed system, the system further comprises:
C) a color measuring device;
D) a formulation database comprising formulas for coating compositions and interrelated colorimetric data;
wherein the computing device is functionally coupled to the color measuring device and the formulation database.

Generally, the color measuring device is a spectrometer, particularly a multi-angle spectrometer, such as a Byk-Mac® I or a spectrometer of the XRite-MA®-T-family.

The output device can also be a component of the system.

According to another embodiment of the system, the computing process further comprises a color retrieval process for matching the color of the target coating and the at least one sample coating, the matching process comprises at least the steps of:
B8) retrieving from the formulation database one or more preliminary matching formulas based on the sample colorimetric data;
B9) selecting at least one from the one or more preliminary matching formulas so as to minimize the match metric beside other colorimetric metrics like color differences (color difference metric) and texture differences (texture difference metric).

According to still another embodiment of the claimed system, the computing process further comprises the step of
B10) modifying an initial formula, particularly the selected at least one preliminary matching formula, for the sample coating so as to minimize the match metric beside other colorimetric metrics like color differences and optionally texture differences.

Generally, at least the color measuring device, the computing device and the formulation database are networked among each other via respective communicative connections. Each of the communicative connections between the different components of the system may be a direct connection or an indirect connection, respectively. Each communicative connection may be a wired or a wireless connection. Each suitable communication technology may be used. The formulation database, the color measuring device, the computing device each may include one or more communications interfaces for communicating with each other. Such communication may be executed using a wired data transmission protocol, such as fiber distributed data interface (FDDI), digital subscriber line (DSL), Ethernet, asynchronous transfer mode (ATM), or any other wired transmission protocol. Alternatively, the communication may be wirelessly via wireless communication networks using any of a variety of protocols, such as General Packet Radio Service (GPRS), Universal Mobile Telecommunications System (UMTS), Code Division Multiple Access (CDMA), Long Term Evolution (LTE), wireless Universal Serial Bus (USB), and/or any other wireless protocol. The respective communication may be a combination of a wireless and a wired communication.

The computing device may include or may be in communication with one or more input devices, such as a touch screen, an audio input, a movement input, a mouse, a keypad input and/or the like. Further the computing device may include or may be in communication with one or more output devices, such as an audio output, a video output, screen/display output, and/or the like.

Embodiments of the invention may be used with or incorporated in a computer system that may be a standalone unit or include one or more remote terminals or devices in communication with a central computer, located, for example, in a cloud, via a network such as, for example, the Internet or an intranet. As such, the computing device described herein and related components may be a portion of a local computer system or a remote computer or an online system or a combination thereof. The formulation database and software described herein may be stored in computer internal memory or in a non-transitory computer readable medium.

Within the scope of the present disclosure the database may be part of the data storage unit or may represent the data storage unit itself. The terms "database" and "data storage unit" are used synonymously.

The present disclosure describes the match metric as a metric that can be combined with other metrics in the field of color searching, matching and adjusting, such as, for example, color differences, sparkle differences, flop differences, etc. The interpretation of the match metric is facilitated in the overview with the other metrics as the value ranges of all such different metrics lie in a comparable scale space.

The proposed method and system enables a better converging of a color matching and adjustment process. Further an effort needed in a respective laboratory can be reduced for color development and for customer service matching. The color matching process as a whole is more reliable and faster.

The invention is further defined in the following examples. It should be understood that these examples, by indicating preferred embodiments of the invention, are given by way of illustration only. From the above discussion and the examples, one skilled in the art can ascertain the essential characteristics of this invention and without departing from the spirit and scope thereof, can make various changes and modifications of the invention to adapt it to various uses and conditions.

DETAILED DESCRIPTION OF THE DRAWINGS

Figure 1:
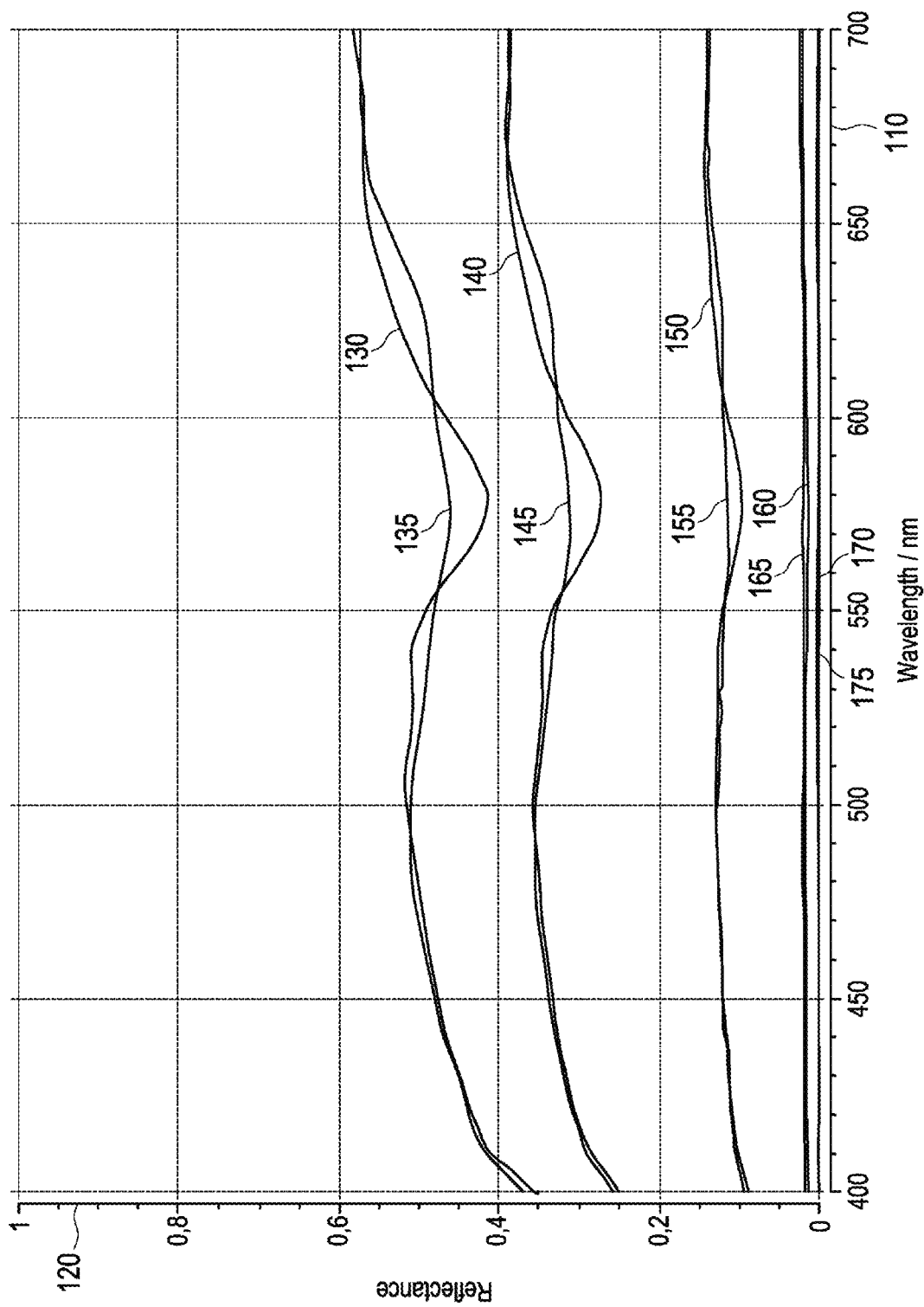
FIG. 1 shows a diagram of spectral reflectance curves of a target coating and a sample coating.

FIG. 1 shows normalized spectral measurements, i.e. normalized spectral reflectance curves of a target coating and a sample coating at different viewing angles. The in-plane bidirectional reflectance of a metallic pigmented sample coating was measured using a multi-angle spectrometer, e. g. a Byk-Mac® I or a spectrometer of the XRite MA®-T-family. Reflectance of the sample coating is measured from several geometries, namely with a given illumination angle of 45° measured relative to the surface normal of the coating and viewing angles of −15°, 15°, 25°, 45°, 75°, 110°, each measured relative to the specular angle.

The wavelength of an incident light flux is plotted along a horizontal axis 110. The normalized reflectance of the sample coating and of the target coating is plotted along a vertical axis 120. The measured reflectance values are normalized using a scaling function $f_{ref/smp}$:

$$f_{ref/smp} = \frac{1}{Norm_{R_{ref/smp}}}$$

with $$Norm_{R_{ref/smp}} = \frac{116 \cdot x_{ref/smp} - 16}{100}$$

with $$x_{ref/smp} = \begin{cases} \sqrt[3]{R_{ref/smp,center}}, & R_{ref/smp,center} > \frac{216}{24389} \\ \frac{\frac{24389}{27} R_{ref/smp,center} + 16}{116}, & \text{otherwise} \end{cases}$$

wherein $R_{ref/smp,center}$ is given by:

$$R_{ref/smp,center} = R_{ref/smp,min} + \frac{R_{ref/smp,max} - R_{ref/smp,min}}{2}$$

with $$R_{ref/smp,max} = \text{Max}(R_{ref/smp,\lambda_i}) \text{ and } R_{ref/smp,min} = \text{Min}(R_{ref/smp,\lambda_i})$$

The curve 130 indicates the reflectance of the target coating measured at a viewing angle of −15°, the curve 135 indicates the reflectance of the sample coating measured at the viewing angle of −15°. The curve 140 indicates the reflectance of the target coating and the curve 145 indicates the reflectance of the sample coating measured at a viewing angle of 15°, respectively. The curve 150 indicates the reflectance of the target coating and the curve 155 indicates the reflectance of the sample coating measured at a viewing angle of 25°, respectively. The curve 160 indicates the reflectance of the target coating and the curve 165 indicates the reflectance of the sample coating measured at a viewing angle of 45°, respectively. The curve 170 indicates the reflectance of the target coating and the curve 175 indicates the sample coating measured at a viewing angle of 75°, respectively. The reflectance curve of the target coating and the reflectance curve of the sample coating measured at a viewing angle of 110°, respectively, can not be differentiated in the representation here from the reflectance curves 170, 175, respectively, as at the flop angles 45°, 75° and 110°, only small reflectance values are measured, respectively. Further, only small variances of shape of the respective curves dependent on the wavelength are observed.

The wavelength values of the number of wavelength values for which reflectance is analyzed, are chosen from an interval from a minimum wavelength value to a maximum wavelength value, with the minimum wavelength value being about 420 nm and the maximum wavelength value being about 680 nm, i.e.:

$$\lambda_i = \lambda_{min}, \ldots, \lambda_{max}$$

$$\lambda_{min} \approx 420 \text{ nm}$$

$$\lambda_{max} \approx 680 \text{ nm}$$

wherein the number of analyzed reflectance values between $\lambda_{min}$ and $\lambda_{max}$ is n and the index of the respective reflectance values i∈[0, . . . (n−1)].

Figure 2:
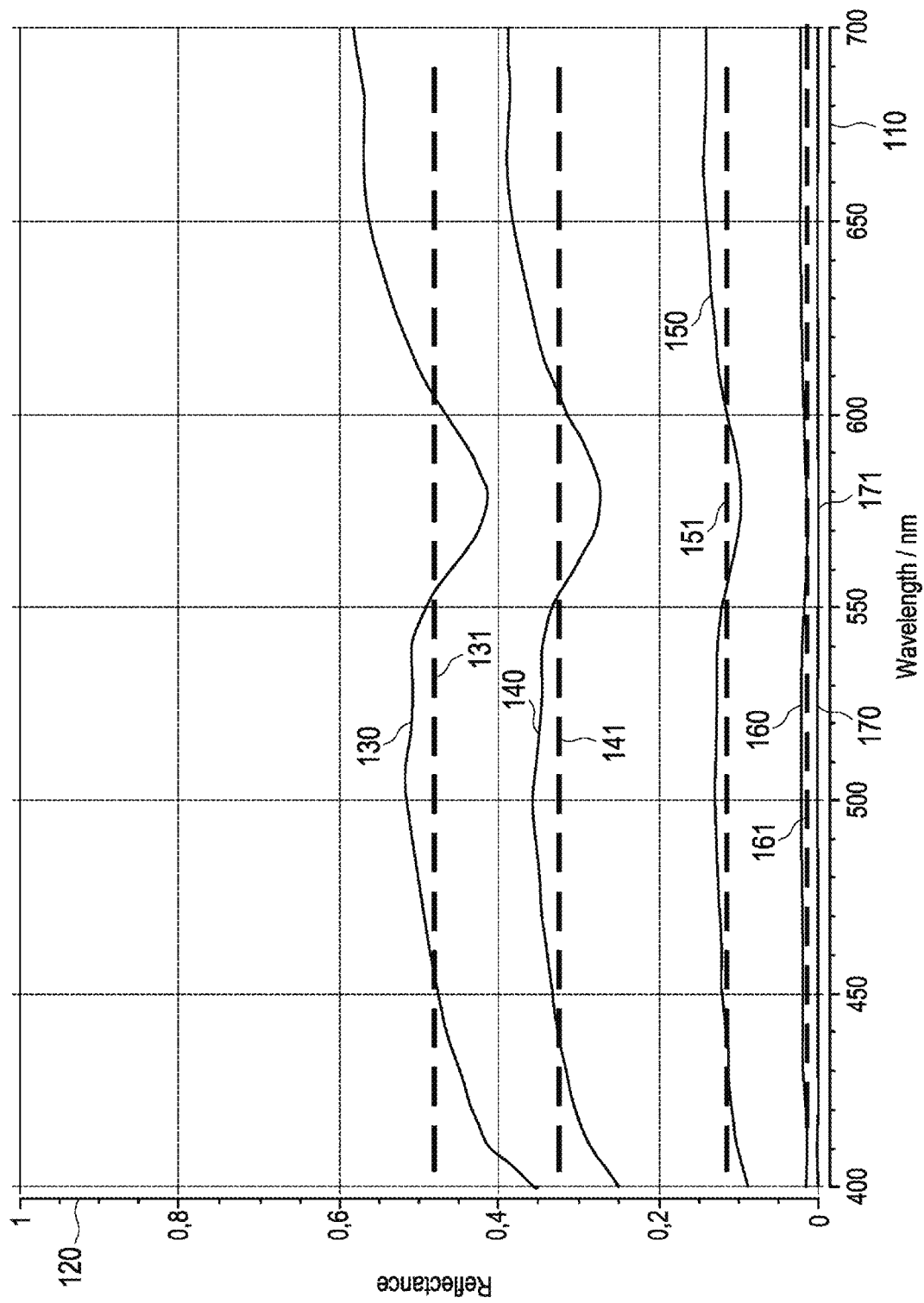
FIG. 2 shows a diagram of the spectral reflectance curves of the target coating of FIG. 1 and, for each spectral reflectance curve, an average reflectance value of the target coating.

FIG. 2 shows a diagram of the spectral reflectance curves of the target coating of FIG. 1 and, for each spectral reflectance curve, an average reflectance value 131, 141, 151, 161, 171 of the target coating, each indicated as dashed line.

Figure 3:
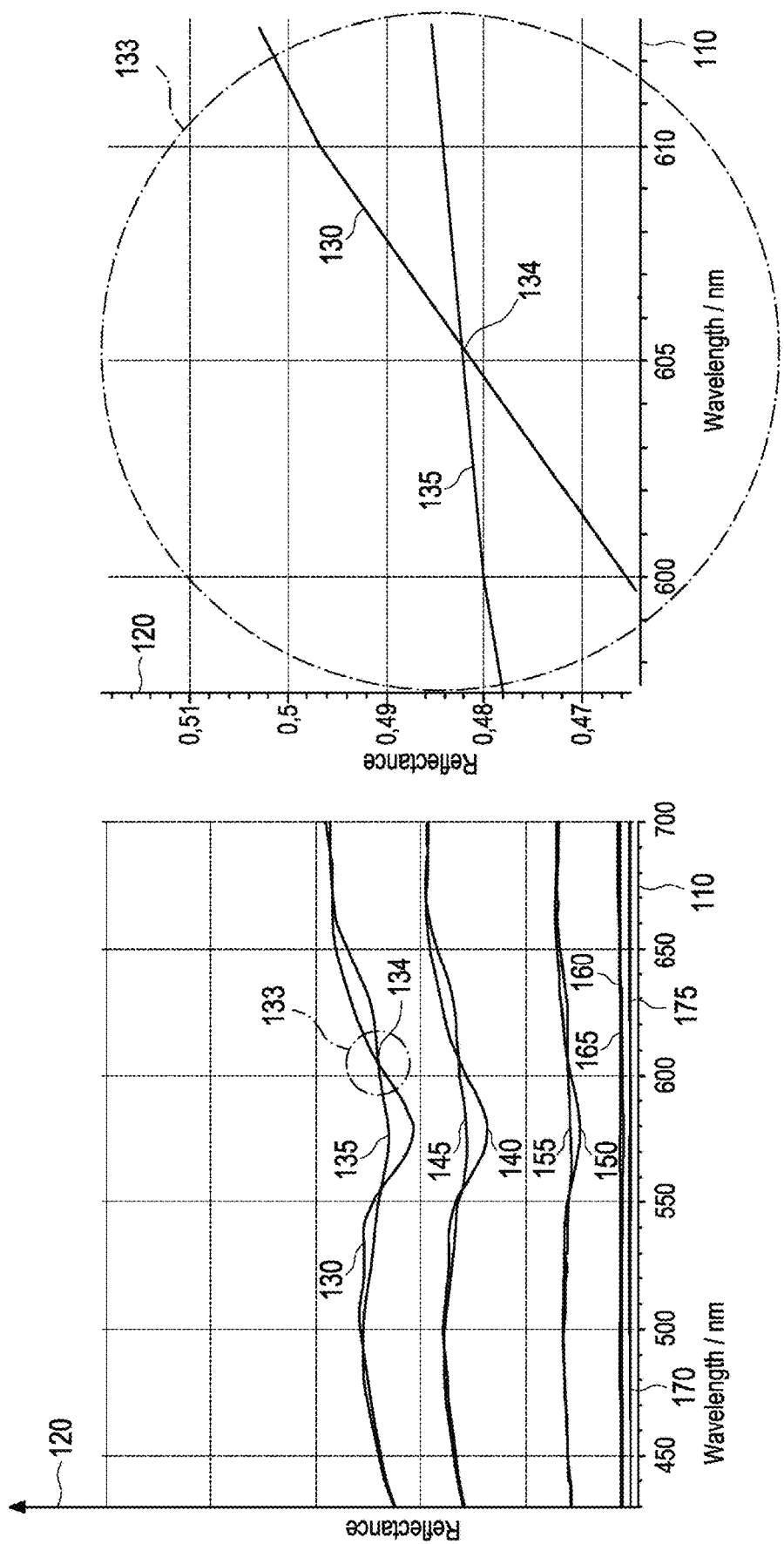
FIG. 3a shows a diagram of the spectral reflectance curves of FIG. 1 wherein a specific region is encircled.
FIG. 3b shows the encircled region of FIG. 3a in an enlarged representation.
FIG. 3c shows a vector indicating a gradient of the reflectance curve of the target coating in the encircled region of FIG. 3b.
FIG. 3d shows a vector indicating a gradient of the reflectance curve of the sample coating in the encircled region of FIG. 3b.
FIG. 3e shows an angle between the vector of FIG. 3c and the vector of FIG. 3d.
Figure 3:
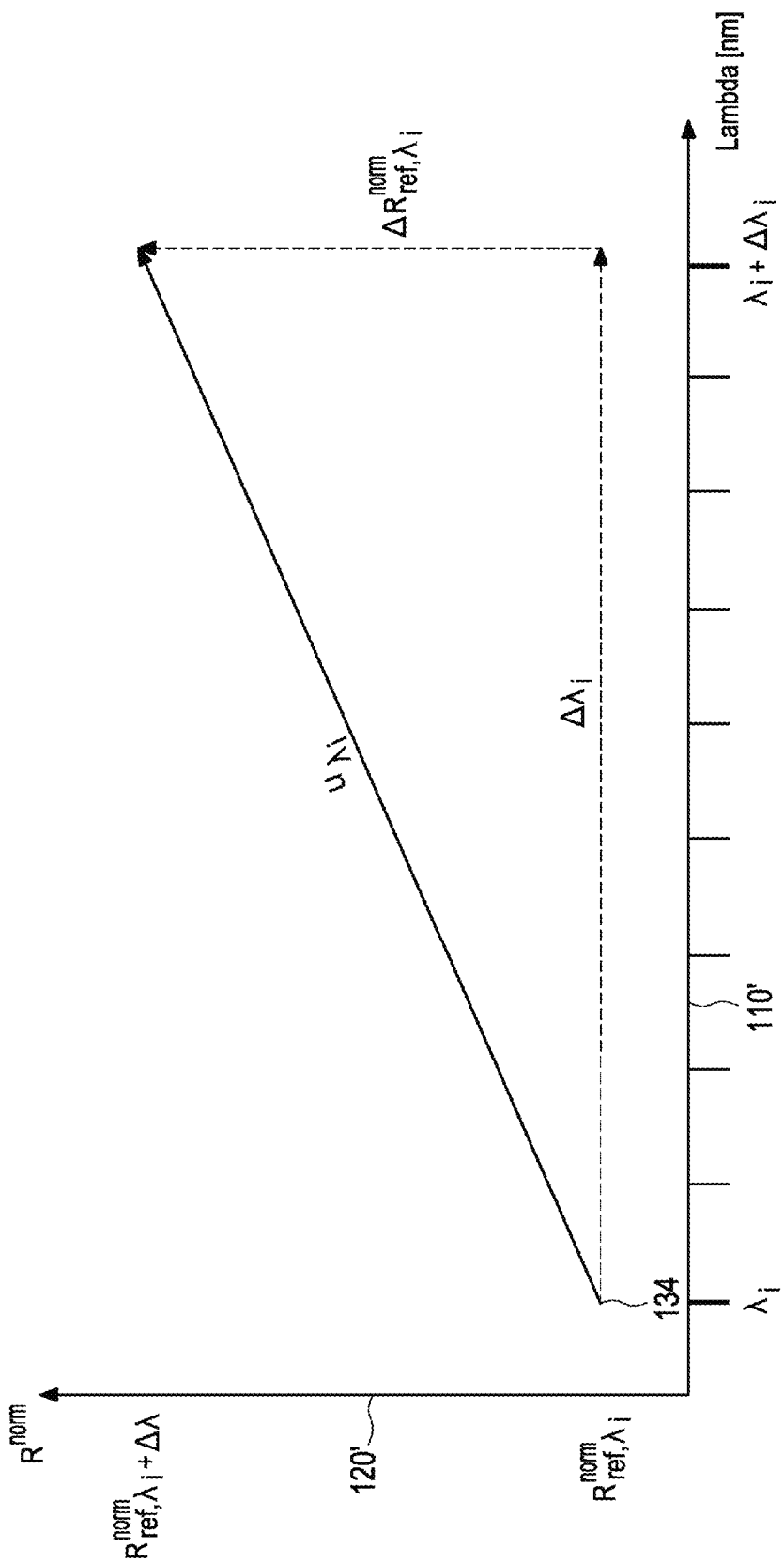
Figure 3:
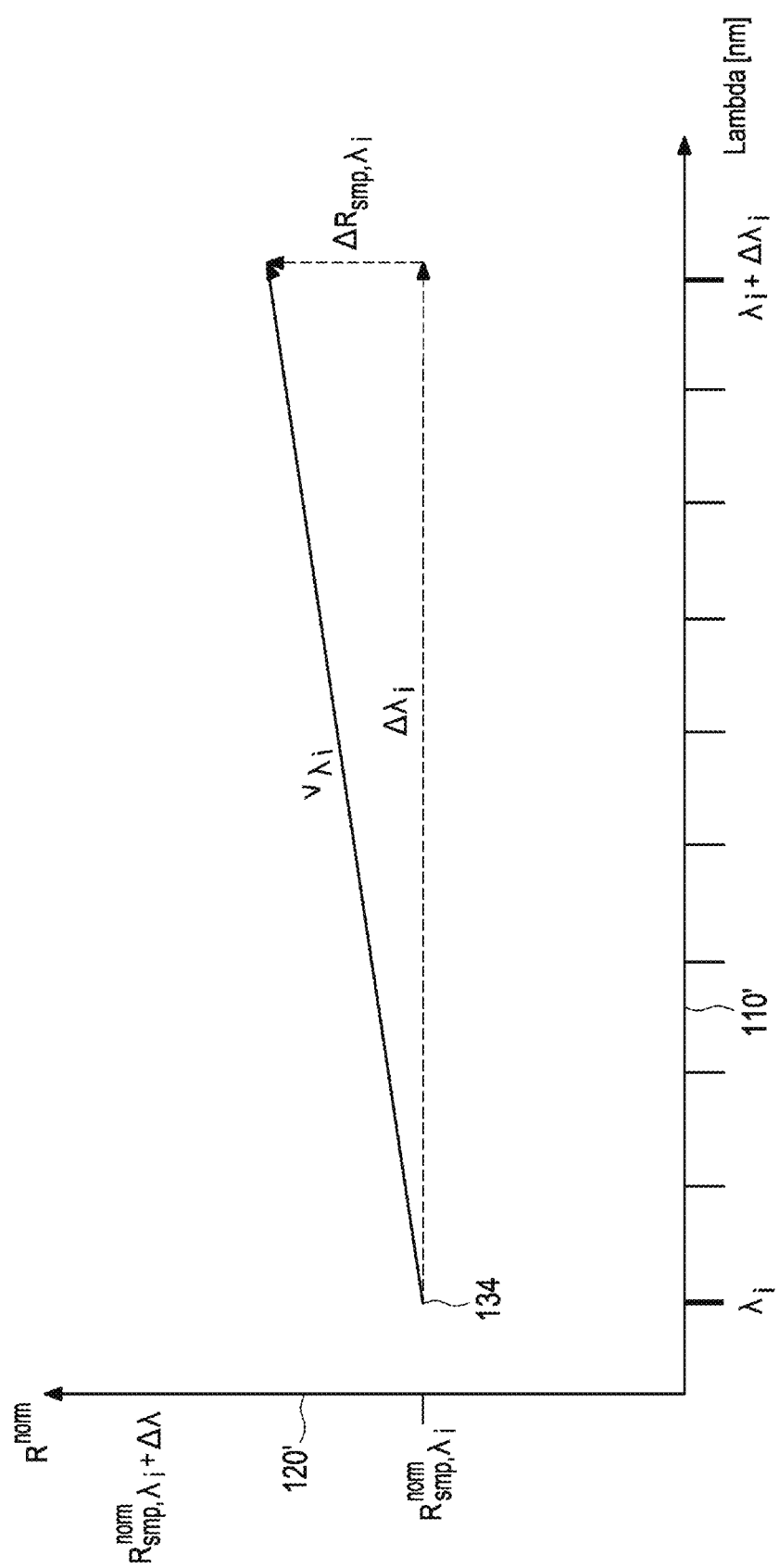
Figure 3:
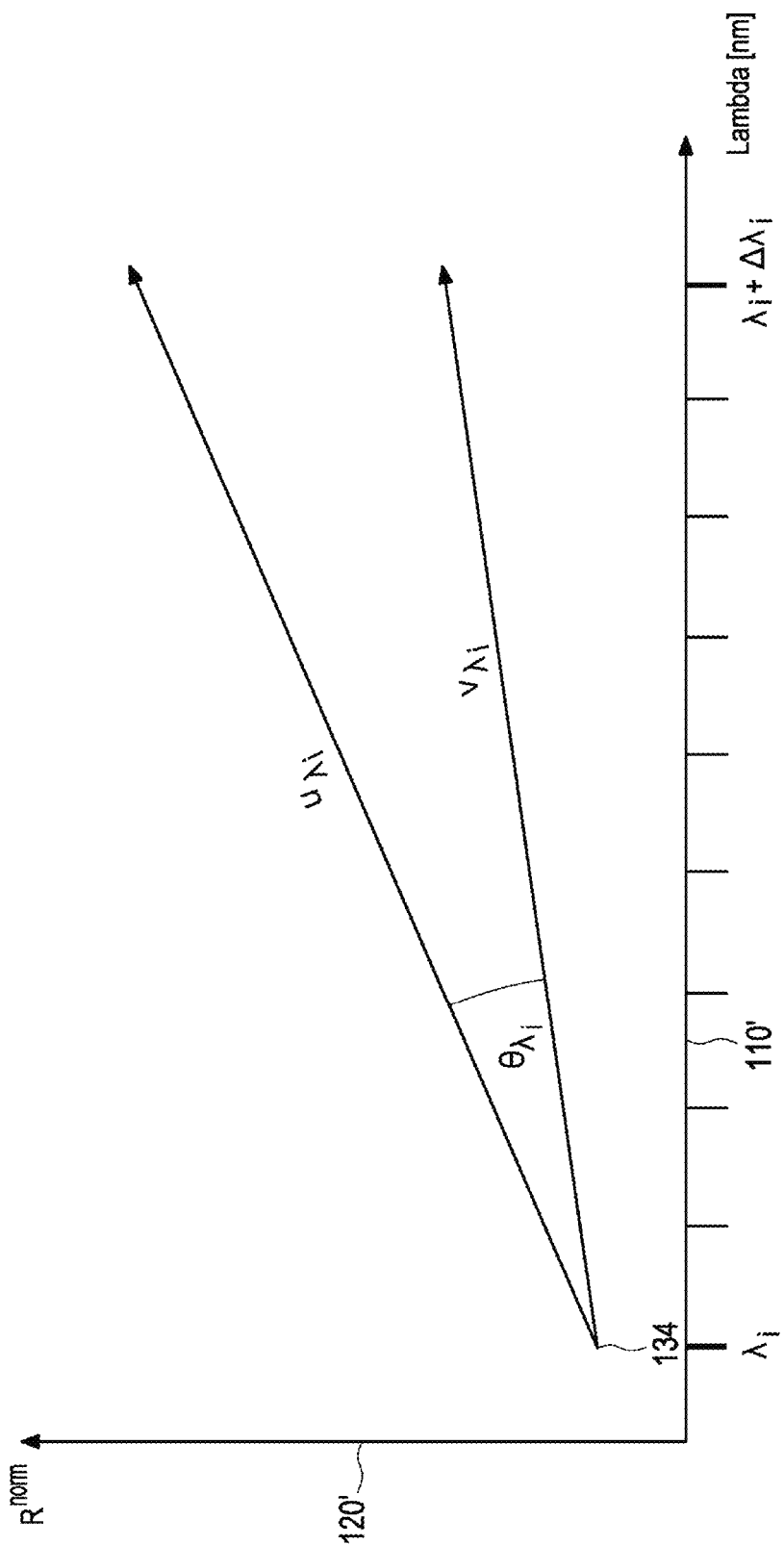

FIG. 3a shows the diagram of the normalized spectral reflectance curves of FIG. 1 wherein a specific region 133 is encircled.

FIG. 3b shows the encircled region 133 of FIG. 3a in an enlarged representation. The crossing point 134 of the two reflectance curves 130 and 135 is considered in the following.

FIG. 3c shows a vector indicating a normalized gradient (=normalized derivative value) of the reflectance curve of the target coating in the encircled region 133 of FIG. 3b, particularly at the crossing point 134. Therefore, only an enlarged section 110' of the horizontal axis 110 is shown which reaches from $\lambda_i \approx 605.3$ nm to $\lambda_i + \Delta\lambda_i$ and only an enlarged section 120' of the vertical axis 120 is shown which embraces reflectance values from $R_{ref,\lambda_i}^{norm}$ to $R_{ref,\lambda_i+\Delta\lambda_i}^{norm}$. By means of the vector representation of the normalized first derivative value of the reflectance curve of the target coating and the normalized first derivative value of the reflectance curve of the sample coating, respectively, a difference value between the normalized first derivative value of the reflectance curve of the target coating and the normalized first derivative value of the reflectance curve of the sample coating can be indicated as an angle $\theta_{\lambda_i}$ (see FIG. 3e).

As shown in FIG. 3c, the normalized first derivative value of the reflectance curve of the target coating at the crossing point 134 is represented for $\lambda_i \approx 605.3$ nm as a two-dimensional vector $u_{\lambda_i}$ according to the following formula:

$$u_{\lambda_i} = \begin{pmatrix} k_1 \cdot \Delta\lambda_i \\ \Delta R_{ref,\lambda_i}^{norm} \end{pmatrix}$$

with $$\Delta R_{ref,\lambda_i}^{norm} = R_{ref,\lambda_i+\Delta\lambda_i}^{norm} - R_{ref,\lambda_i}^{norm}, \text{ and}$$

$$\Delta\lambda_i = \lambda_{i+1} - \lambda_i,$$

wherein $R_{ref,\lambda_i}^{norm}$ indicates a normalized reflectance value of the target coating at the wavelength value $\lambda_i$, $R_{ref,\lambda_i+\Delta\lambda_i}^{norm}$ indicates the normalized reflectance value of the target coating at the wavelength value $\lambda_{i+1} = \lambda_i + \Delta\lambda_i$. $k_1$ is a non-linear damping parameter with $k_1 = 0.005$.

FIG. 3d shows a normalized vector indicating a gradient of the reflectance curve of the sample coating in the encircled region of FIG. 3b, particularly at the crossing point 134. Again, only the enlarged section of the horizontal axis 110' is shown which reaches from $\lambda_i \approx 605.3$ nm to $\lambda_i + \Delta\lambda_i$. Furthermore, only an enlarged section 120' of the vertical axis 120 is shown which embraces reflectance values from $R_{smp,\lambda_i}^{norm}$ to $R_{smp,\lambda_i+\Delta\lambda_i}^{norm}$.

As shown in FIG. 3d, the normalized first derivative value of the reflectance curve of the sample coating at the crossing point 134 is represented for $\lambda_i \approx 605.3$ nm as a two-dimensional vector according to the following formula:

$$v_{\lambda_i} = \begin{pmatrix} k_1 \cdot \Delta\lambda_i \\ \Delta R_{smp,\lambda_i}^{norm} \end{pmatrix}$$

$$\Delta R_{smp,\lambda_i}^{norm} = R_{smp,\lambda_i+\Delta\lambda_i}^{norm} - R_{smp,\lambda_i}^{norm}, \text{ and}$$

$$\Delta\lambda_i = \lambda_{i+1} - \lambda_i,$$

$R_{smp,\lambda_i}^{norm}$ indicates a normalized reflectance value of the sample coating at the wavelength value $\lambda_i$, $R_{smp,\lambda_{i+1}}^{norm}$ indicates a normalized reflectance value of the sample coating at the wavelength value $\lambda_{i+1} = \lambda_i + \Delta\lambda_i$. $k_1$ is the non-linear damping parameter.

FIG. 3e shows the angle $\theta_{\lambda_i}$ between the vector $u_{\lambda_i}$ of FIG. 3c and the vector $v_{\lambda_i}$ of FIG. 3d, thus indicating a difference value of the gradient (=normalized derivative value) of the reflectance curve 130 of the target coating and of the gradient (=normalized derivative value) of the reflectance curve 135 of the sample coating at this crossing point 134, i.e. at the wavelength value $\lambda_i \approx 605.3$ nm. $\theta_{\lambda_i}$ indicates the angle between the two normalized vectors $u_{\lambda_i}$ and $v_{\lambda_i}$, the vector $u_{\lambda_i}$ indicating a gradient of the reflectance curve of the target coating at $\lambda_i$ and the vector $v_{\lambda_i}$ indicating a gradient of the reflectance curve of the sample coating at $\lambda_i$. Thus, $\theta_{\lambda_i}$ indicates a kind of difference angle/value and is determined according to the following formula (cosine theorem):

$$\theta_{\lambda_i} = \cos^{-1}\left(\frac{u_{\lambda_i} \cdot v_{\lambda_i}}{|u_{\lambda_i}| \cdot |v_{\lambda_i}|}\right)$$

$$\theta_{\lambda_i} \in \left[0, \frac{\pi}{2}\right]$$

Figure 4:
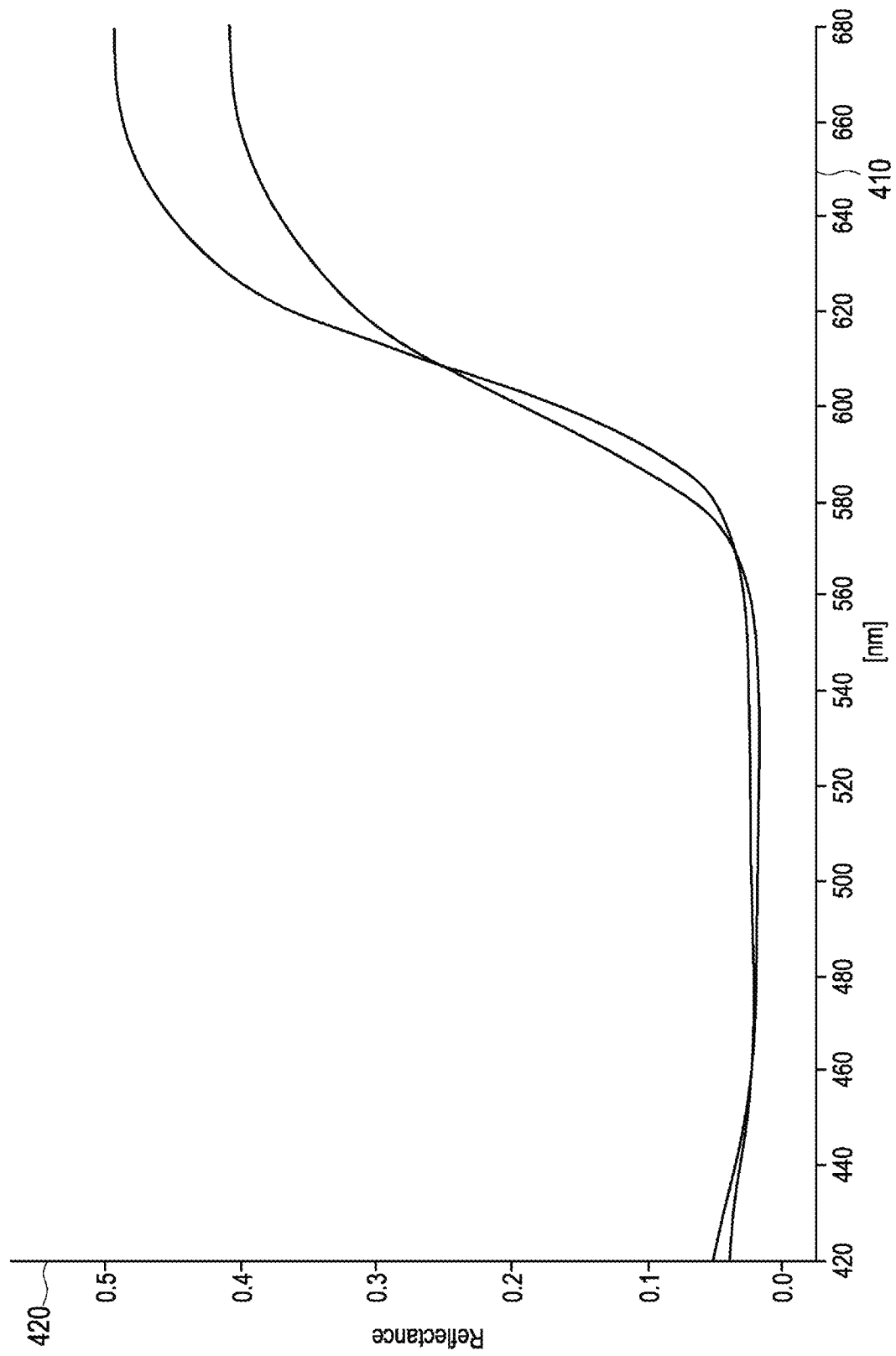
FIG. 4 shows in the FIGS. 4a to 4k examples of values of a match metric as provided by an embodiment of the proposed method.
Figure 4C:
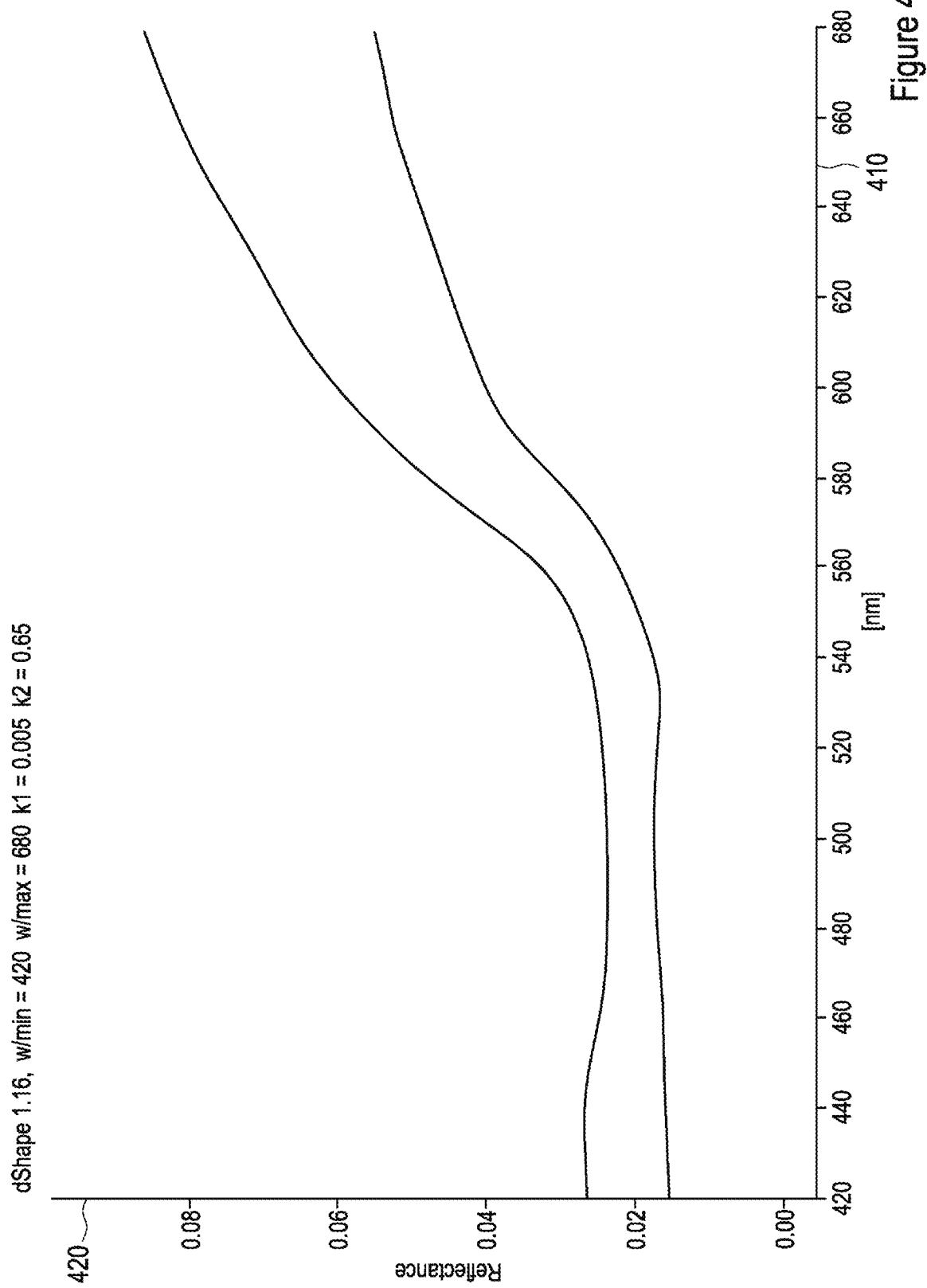
Figure 4:
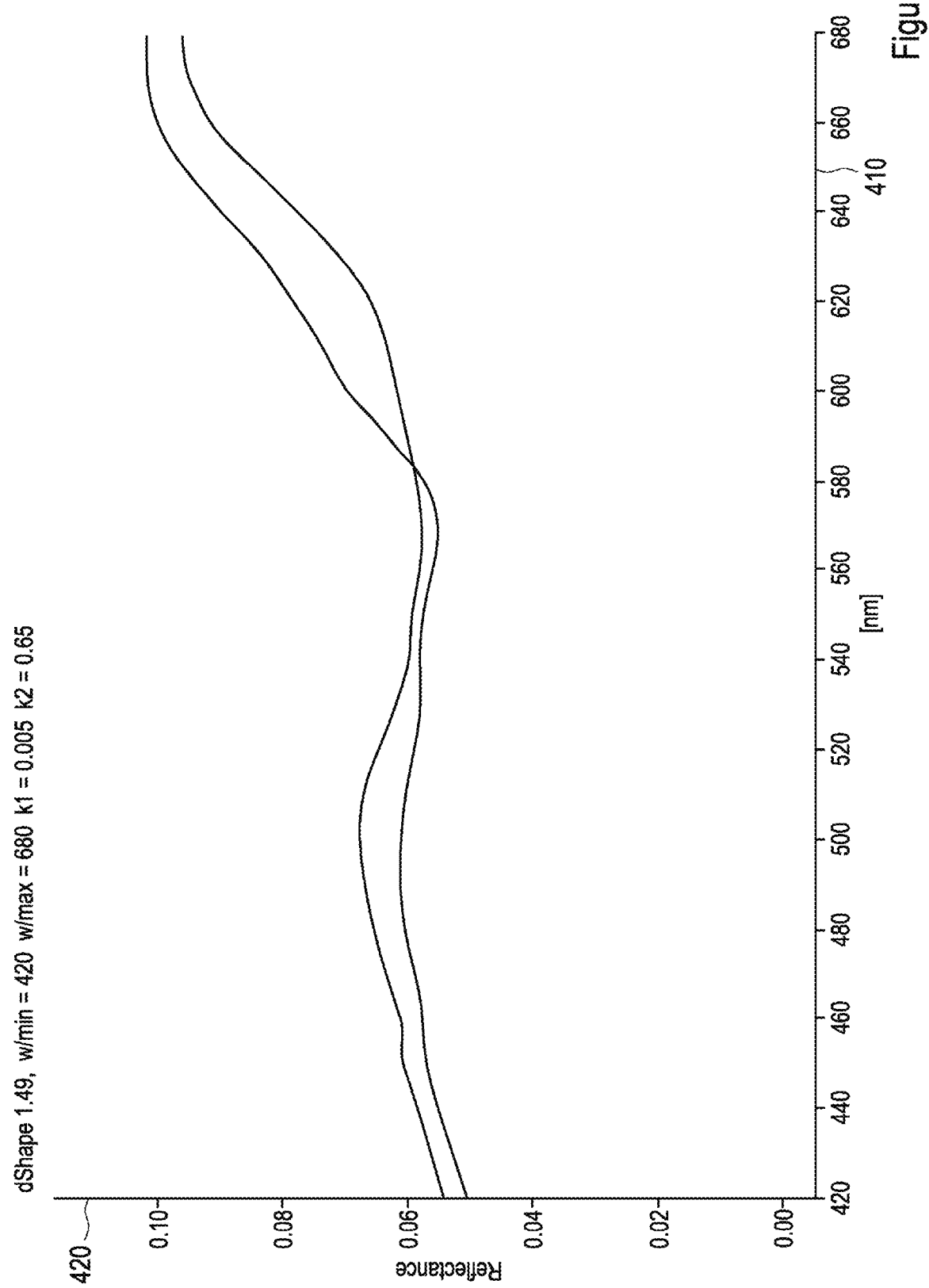
Figure 4F:
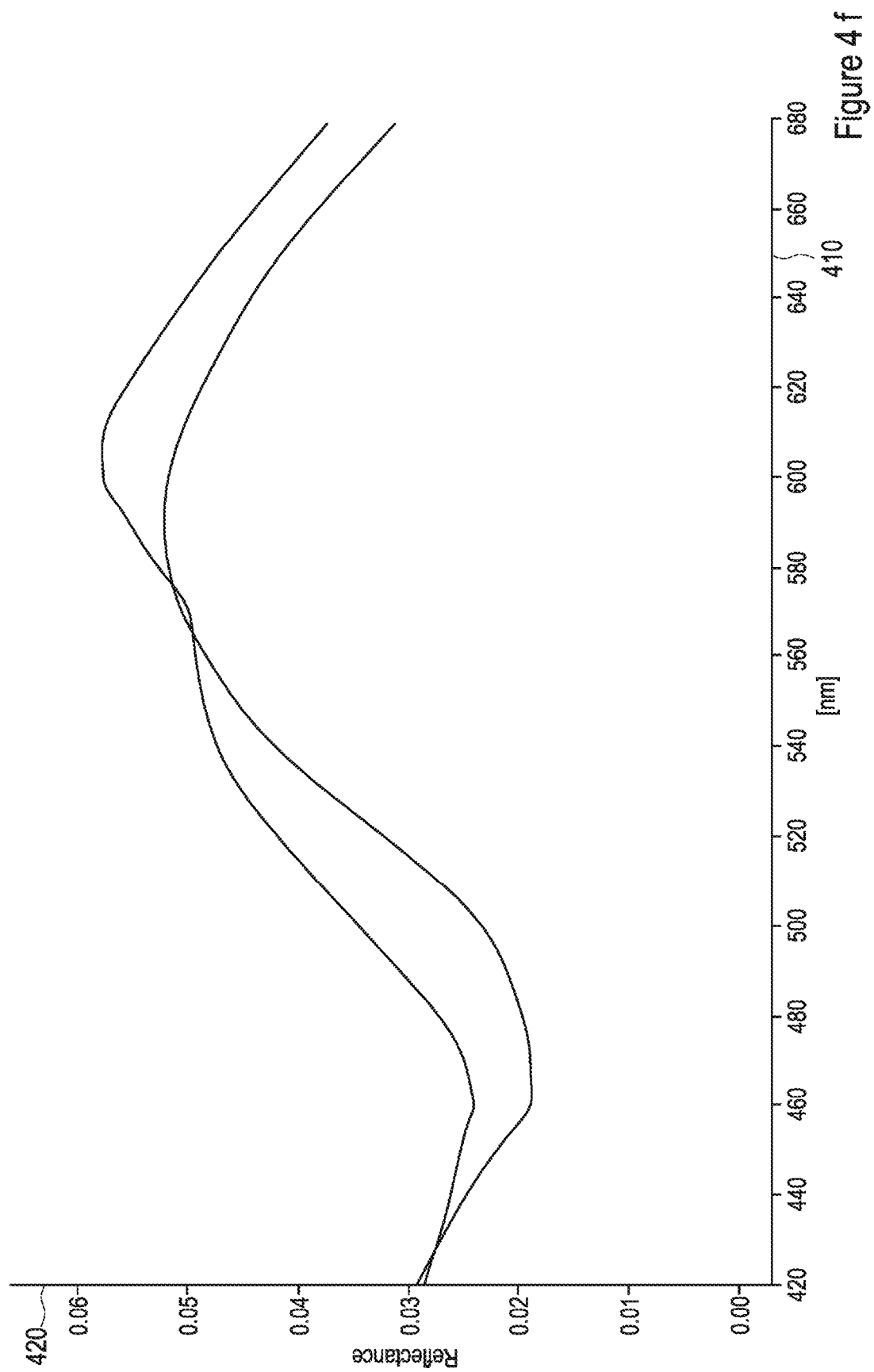
Figure 4:
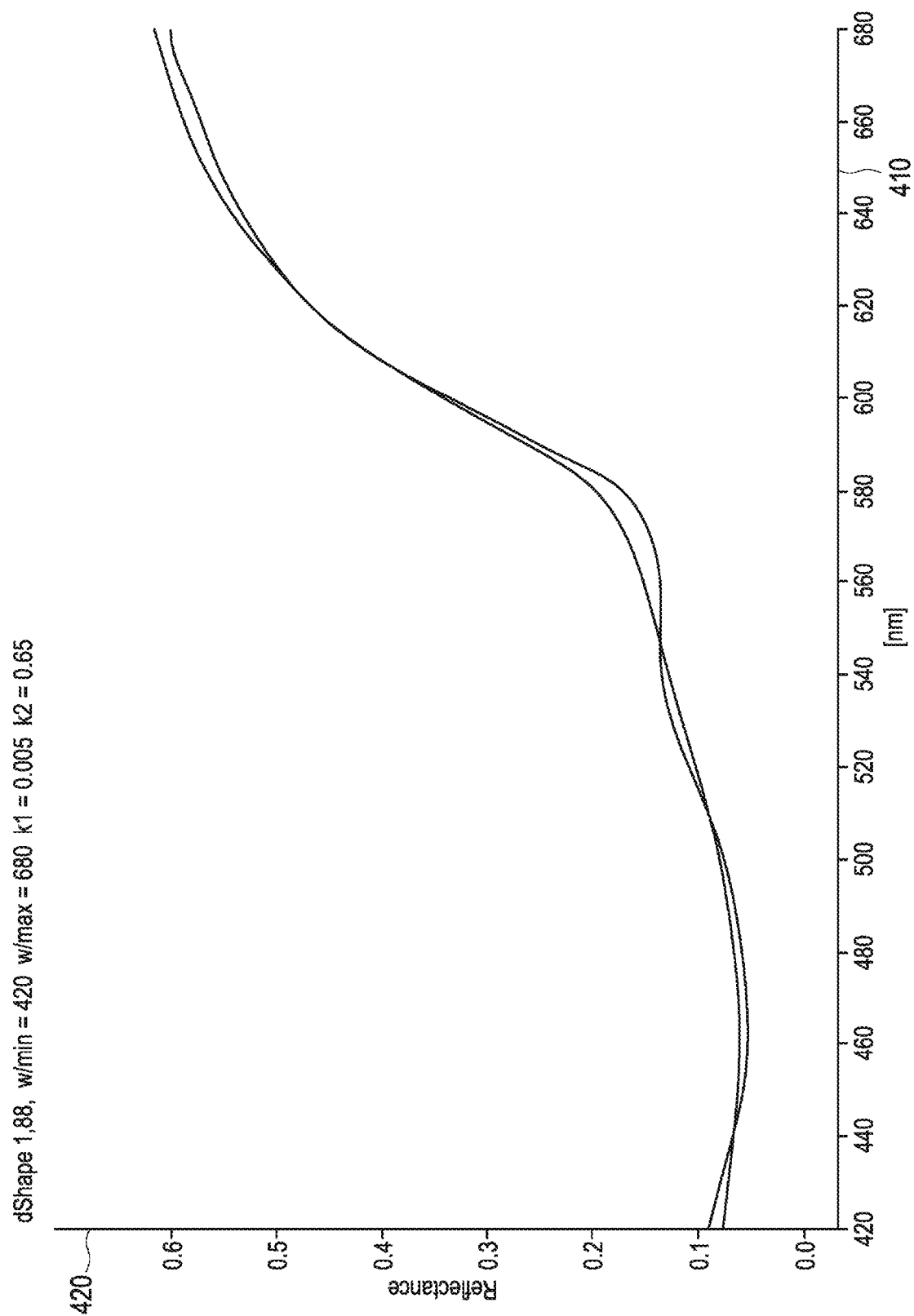
Figure 4:
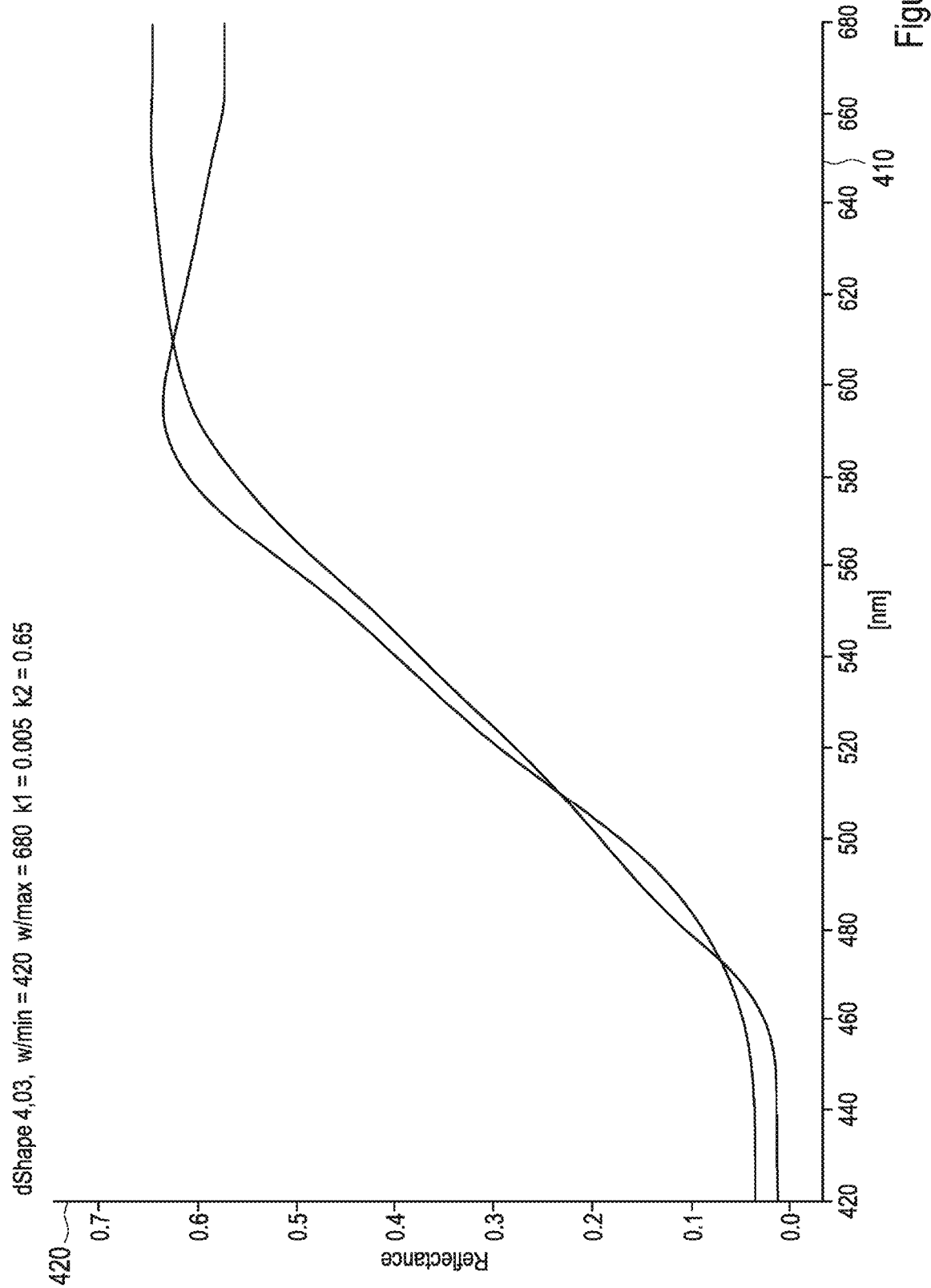
Figure 4:
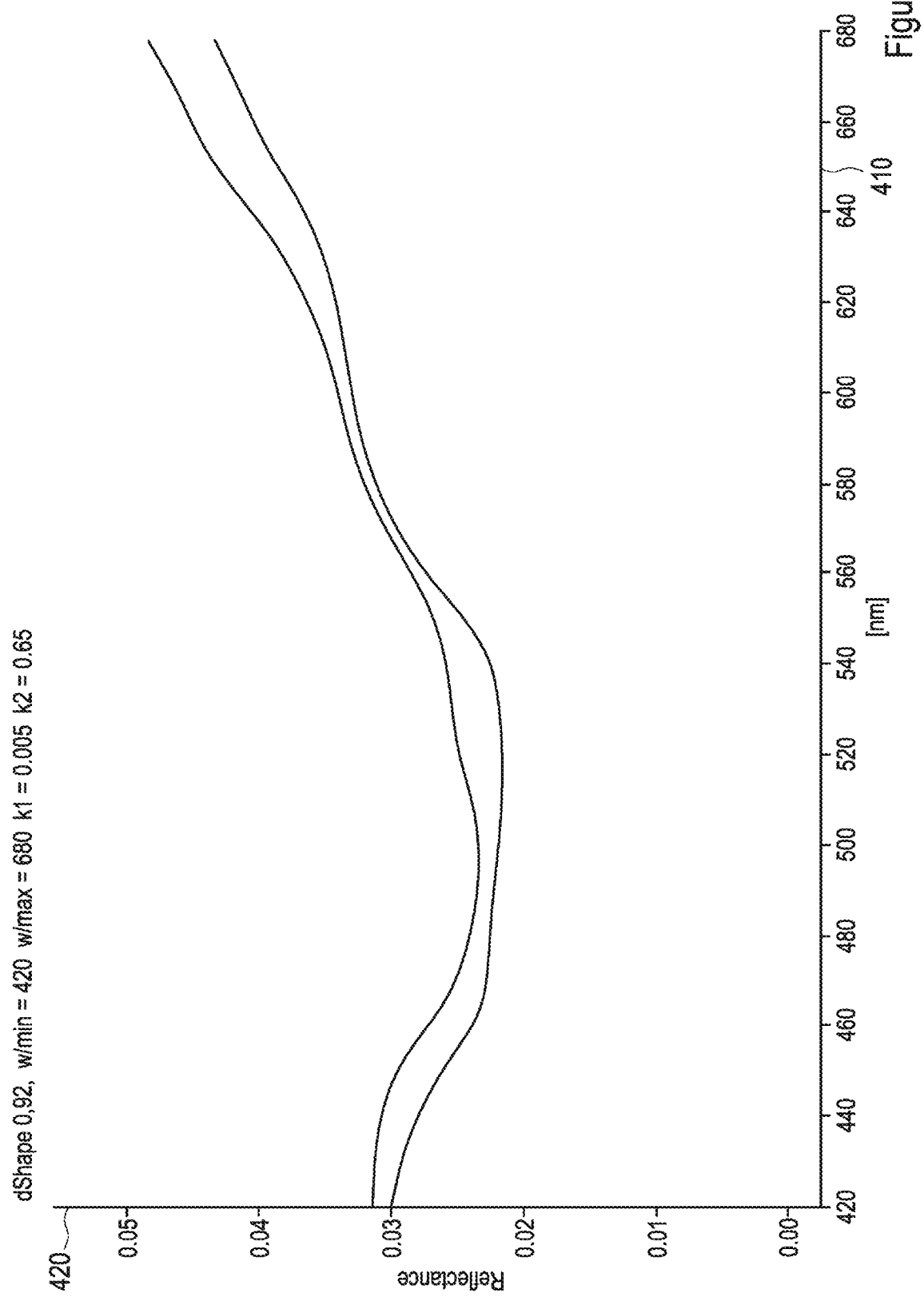
Figure 4J:
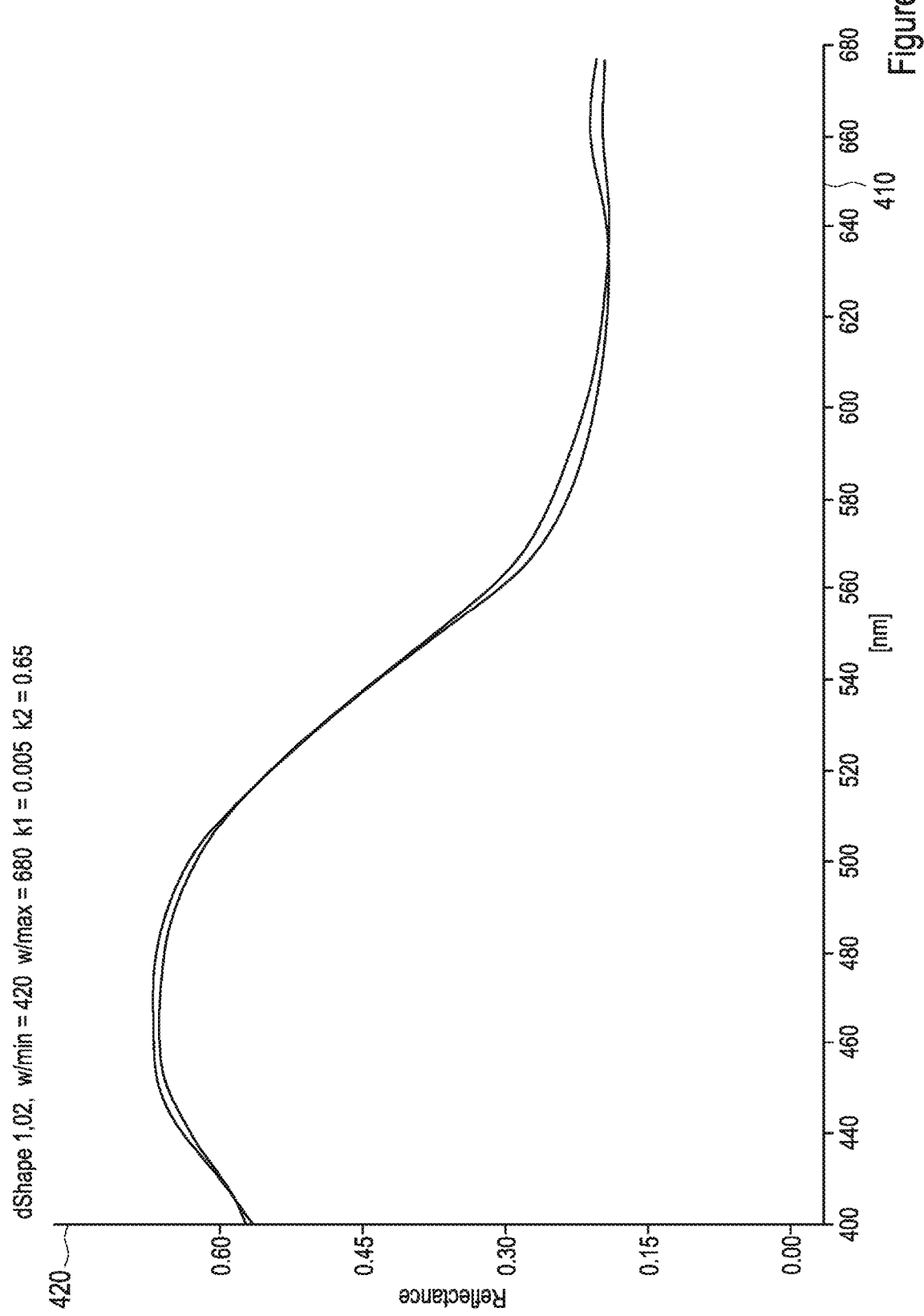

FIG. 4 shows in the FIGS. 4a to 4k examples of values of the match metric dShape as provided by an embodiment of the proposed method.

FIGS. 4a to 4k, each show a diagram of a normalized spectral curve of a target coating and a normalized spectral curve of a sample coating. The wavelength values are plotted along a horizontal axis 410 and are chosen from an interval from a minimum wavelength value to a maximum wavelength value, with the minimum wavelength value being 420 nm and the maximum wavelength value being 680 nm. The normalized reflectance values of the target coating and the sample coating, respectively, are plotted along a vertical axis 420 which ranges from 0.0 to 0.5.

Above each diagram, the respective value of the match metric dShape, the minimum wavelength value wlmin, the maximum wavelength value wlmax, the non-linear damping parameter $k_1$ and the linear scaling-factor $k_2$ are stated.

Figure 5:
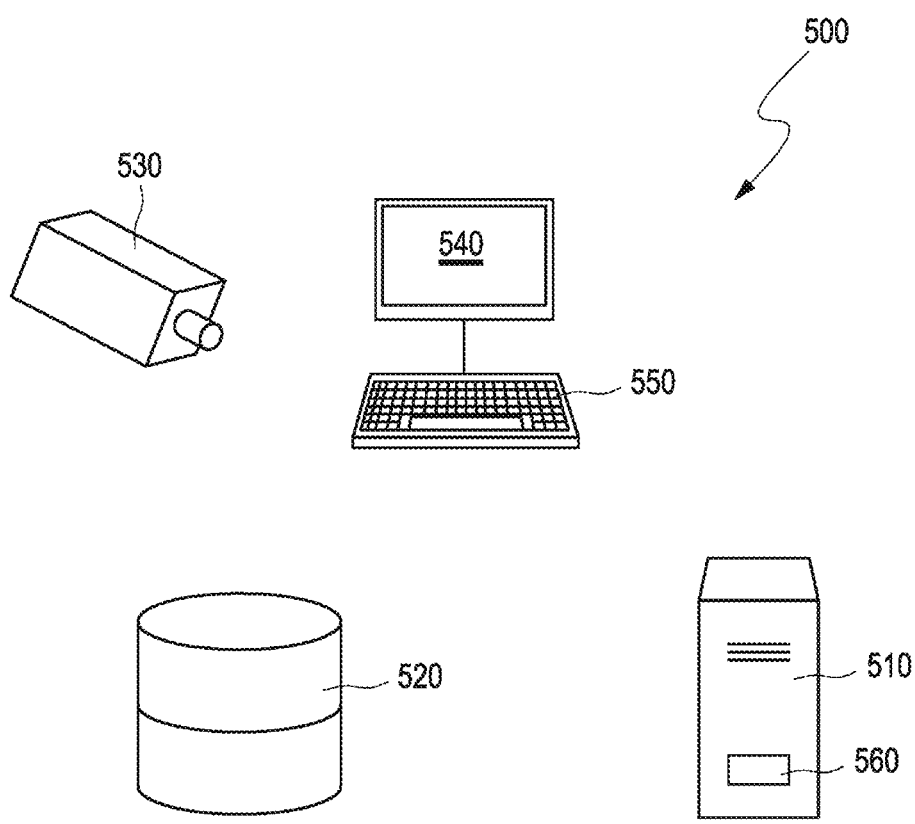
FIG. 5 schematically shows an embodiment of the proposed system.

FIG. 5 schematically illustrates an embodiment of the proposed system. The system 500 shown here comprises a computing device 510, a formulation database 520, a color measurement device 530, an output device 540, an input device 550 and a computer readable storage medium 560. The system further comprises a computer program product which comprises computer executable codes stored on the computer readable storage medium 560. In the example shown here, the computer readable storage medium 560 is loaded in an internal memory of the computing device 510. Thus, the computer readable storage medium 560 is functionally coupled to the computing device 510. Any other functional coupling of the computer readable storage medium 560 and the computing device 510 is possible. The computer readable storage medium 560 causes the computing device 510 to perform a computing process when in operation, the computing process comprises the steps of:

B1) receiving, via a communications interface, for a number of wavelength values, reflectance values of the target coating and reflectance values of the sample coating, wherein the reflectance values of the target coating are determined, particularly measured, at one or more measurement geometries, and the reflectance values of the sample coating are determined, particularly measured, at the one or more measurement geometries;

B2) normalizing each of the reflectance values of the target coating determined at the respective one or more measurement geometries and the reflectance values of the sample coating determined at the respective one or more measurement geometries by using a non-linear scaling function;

B3) generating a normalized reflectance curve for the target coating based on the normalized reflectance values of the target coating for each wavelength value, and a normalized reflectance curve for the sample coating based on the normalized reflectance values of the sample coating for each wavelength value;

B4) producing, for the number of wavelength values, normalized first derivative values of the normalized reflectance curve of the target coating with respect to the wavelength and normalized first derivative values of the normalized reflectance curve of the sample coating with respect to the wavelength;

B5) producing, for each wavelength value of the number of wavelength values, difference values between the normalized first derivative values of the normalized reflectance curve of the target coating and the normalized first derivative values of the normalized reflectance curve of the sample coating;

B6) producing a match metric for the similarity of the normalized reflectance curves of the target coating and the sample coating based at least on the difference values for all of the number of wavelength values, and B7) outputting, using the output device 540, the produced match metric to a user.

The formulation database 520 comprises formulas for coating compositions and interrelated colorimetric data and is functionally coupled to the computing device 510.

Generally, the color measuring device 530 which is also functionally coupled to the computing device 510, is a spectrometer, particularly a multi-angle spectrometer, such as a Byk-Mac® I or a spectrometer of the XRite-MA®-T-family.

The computing process may further comprise a color retrieval process for matching the color of the target coating and the at least one sample coating, the matching process comprises at least the steps of:

B8) retrieving from the formulation database 520 one or more preliminary matching formulas based on the sample colorimetric data;

B9) selecting at least one from the one or more preliminary matching formulas so as to minimize the match metric beside other colorimetric metrics like color differences (color difference metric) and texture differences (texture difference metric).

Additionally, the computing process may further comprise the step of

B10) modifying an initial formula, particularly the selected at least one preliminary matching formula, for the sample coating so as to minimize the match metric beside other colorimetric metrics like color differences and optionally texture differences.

Generally, at least the color measuring device 530, the computing device 510 and the formulation database 520 are networked among each other via respective communicative connections. Further, the input device 550 and the output device 540 are part of the computing device 510 or at least functionally coupled with the computing device 510. It is possible to illustrate on the output device 540 simultaneously, both, the target coating, i.e. the spectral curve of the target coating, and the sample coating, i.e. the spectral curve of the sample coating, so as to allow a visual comparison "on the fly", i.e. during operation of the matching process.

LIST OF REFERENCES 110 horizontal axis
120 vertical axis
130 reflectance curve at −15°
135 reflectance curve at −15°
140 reflectance curve at 15°
145 reflectance curve at 15°
150 reflectance curve at 25°
155 reflectance curve at 25°
160 reflectance curve at 45°
165 reflectance curve at 45°
170 reflectance curve at 75°
175 reflectance curve at 75°
131 average reflectance value at −15°
141 average reflectance value at 15°
151 average reflectance value at 25°
161 average reflectance value at 45°
171 average reflectance value at 75°
133 specific region
134 crossing point
110' enlarged section of horizontal axis 110
120' enlarged section of vertical axis 120
410 horizontal axis
420 vertical axis
500 system
510 computing device
520 formulation database 530 color measurement device
540 output device
550 input device
560 computer readable storage medium

The invention claimed is:

1. A computer-implemented method for providing a match metric for quantifying a spectral similarity between a target coating and at least one sample coating, the method comprising at least the steps of:
   a) obtaining, for a number of wavelength values, reflectance values of the target coating and reflectance values of the sample coating, wherein the reflectance values of the target coating are determined at one or more measurement geometries, and the reflectance values of the sample coating are determined at the one or more measurement geometries; and
   by using one or more processors:
   b) normalizing each of the reflectance values of the target coating determined at the respective one of the one or more measurement geometries and the reflectance values of the sample coating determined at the respective one of the one or more measurement geometries by using a scaling function;
   c) generating a normalized reflectance curve for the target coating based on the normalized reflectance values of the target coating for each wavelength value, and a normalized reflectance curve for the sample coating based on the normalized reflectance values of the sample coating for each wavelength value;
   d) producing, for the number of wavelength values, normalized first derivative values of the normalized reflectance curve of the target coating with respect to the wavelength and normalized first derivative values of the normalized reflectance curve of the sample coating with respect to the wavelength;
   e) producing, for each wavelength value of the number of wavelength values, difference values between the normalized first derivative values of the normalized reflectance curve of the target coating and the normalized first derivative values of the normalized reflectance curve of the sample coating;
   f) producing a match metric for a similarity between the normalized reflectance curves of the target coating and the sample coating based at least on the difference values for all of the number of wavelength values; and
   g) outputting, using an output device, the produced match metric for a user;
   wherein the normalized first derivative values of the normalized reflectance curve of the target coating and the normalized first derivative values of the normalized reflectance curve of the sample coating, respectively, are represented, for each wavelength value as a two-dimensional vector according to the following formulas:

$$u_{\lambda_i} = \begin{pmatrix} k_1 \cdot \Delta\lambda_i \\ \Delta R_{ref,\lambda_i}^{norm} \end{pmatrix}$$

$$v_{\lambda_i} = \begin{pmatrix} k_1 \cdot \Delta\lambda_i \\ \Delta R_{smp,\lambda_i}^{norm} \end{pmatrix}$$

$$\theta_{\lambda_i} = \cos^{-1}\left( \frac{u_{\lambda_i} \cdot v_{\lambda_i}}{|u_{\lambda_i}| \cdot |v_{\lambda_i}|} \right)$$

with $\Delta R_{ref,\lambda_i}^{norm} = R_{ref,\lambda_i+\Delta\lambda_i}^{norm} - R_{ref,\lambda_i}^{norm}$, and $\Delta R_{smp,\lambda_i}^{norm} = R_{smp,\lambda_i+\Delta\lambda_i}^{norm} - R_{smp,\lambda_i}^{norm}$, and $\Delta\lambda_i = \lambda_{i+1} - \lambda_i$, wherein $R_{ref,\lambda_i}^{norm}$ indicates a normalized reflectance value for the target coating at the wavelength value, $\lambda_i$, $R_{ref,\lambda_i+\Delta\lambda_i}^{norm}$ indicates a normalized reflectance value for the target coating at the wavelength value, $\lambda_{i+1}$, $R_{smp,\lambda_i}^{norm}$ indicates a normalized reflectance value for the sample coating at the wavelength value, $\lambda_i$, $R_{smp,\lambda_{i+1}}^{norm}$ indicates a normalized reflectance value for the sample coating at the wavelength value, $\lambda_{i+1}$, $k_1$ is a non-linear damping parameter with $k_1=0.005$ and $\theta_{\lambda_i}$ indicates the angle between the two normalized vectors $u_{\lambda_i}$ and $v_{\lambda_i}$, the vector $u_{\lambda_i}$ indicating a normalized gradient of the reflectance curve of the target coating at $\lambda_i$, and the vector $v_{\lambda_i}$ indicating a normalized gradient of the reflectance curve of the sample coating at $\lambda_i$.

2. The method according to claim 1, the method further comprising the step of:
   h) retrieving from a formulation database which comprises formulas for coating compositions and interrelated colorimetric characteristics, one or more preliminary matching formulas based on reflectance values of the sample coating and/or further pre-determined color characteristics of the sample coating or a combination thereof.

3. The method according to claim 1, the method further comprising the step of:
   i) modifying an initial formulation of the sample coating, so as to minimize the match metric for the similarity of the normalized reflectance curves of the target coating and the sample coating as an additional constraint beside existing color difference metric(s).

4. The method according to claim 1, wherein the wavelength values of the number of wavelength values are chosen from an interval from a minimum wavelength value to a maximum wavelength value, with the minimum wavelength value being about 420 nm and the maximum wavelength value being about 680 nm.

5. The method according to claim 1, wherein the scaling function is chosen as a non-linear scaling function $f$, wherein the non-linear scaling function $f_{ref,smp}$ is chosen as follows:

$$f_{ref/smp} = \frac{1}{Norm_{R_{ref/smp}}}$$

with $$Norm_{R_{ref/smp}} = \frac{116 \cdot x_{ref/smp} - 16}{100}$$

with $$x_{\frac{ref}{smp}} = \begin{cases} \sqrt[3]{R_{\frac{ref}{smp},center}}, & R_{\frac{ref}{smp},center} > \frac{216}{24389} \\ \frac{\frac{24389}{27} R_{\frac{ref}{smp},center} + 16}{116}, & \text{otherwise} \end{cases}$$

wherein $R_{ref/smp,center}$ is given by:

$$R_{ref/smp,center} = R_{ref/smp,min} + \frac{R_{ref/smp,max} - R_{ref/smp,min}}{2}$$

with $$R_{ref/smp,max} = R_{ref/smp,max} \text{ and } R_{ref/smp,min} = \text{Min}(R_{ref/smp,\lambda_i})$$

6. The method according to claim 1, wherein the match metric is chosen as follows:

$$dShape = k_2 \cdot \frac{31}{n} \cdot \sum_{i=0}^{n-2} \theta_{\lambda_i}$$

wherein n is an integer and $k_2$ is a linear scaling factor with $k_2=0.65$.

7. The method according to claim 1, wherein the match metric is chosen as follows:

$$dShape^* = k_2^* \cdot \frac{31}{n} \cdot \sum_{i=0}^{n-2} \frac{|\Delta R_{smp,\lambda_i}^{norm} - \Delta R_{ref,\lambda_i}^{norm}|}{k_1 \cdot \Delta \lambda_i}$$

wherein n is an integer and $k_2^*$ is a linear scaling factor with $k_2^*=100$.

8. A system for providing a match metric for quantifying a spectral similarity of a target coating and at least one sample coating, the system comprising:
A) a computing device; and
B) a computer program product, the computer program product comprises computer executable codes stored on a computer readable storage medium functionally coupled to the computing device and causes the computing device to perform a computing process when in operation, the computing process comprises the steps of:
B1) receiving, for a number of wavelength values, reflectance values of the target coating and reflectance values of the sample coating, wherein the reflectance values of the target coating are determined at one or more measurement geometries, and the reflectance values of the sample coating are determined at the one or more measurement geometries;
B2) normalizing each of the reflectance values of the target coating determined at the respective one of the one or more measurement geometries and the reflectance values of the sample coating determined at the respective one of the one or more measurement geometries by using a non-linear scaling function;
B3) generating a normalized reflectance curve for the target coating based on the normalized reflectance values of the target coating for each wavelength value, and a normalized reflectance curve for the sample coating based on the normalized reflectance values of the sample coating for each wavelength value;
B4) producing, for the number of wavelength values, normalized first derivative values of the normalized reflectance curve of the target coating with respect to the wavelength and normalized first derivative values of the normalized reflectance curve of the sample coating with respect to the wavelength;

B5) producing, for each wavelength value of the number of wavelength values, difference values between the normalized first derivative values of the normalized reflectance curve of the target coating and the normalized first derivative values of the normalized reflectance curve of the sample coating; and
B6) producing a match metric for a similarity between the normalized reflectance curves of the target coating and the sample coating based at least on the difference values for all of the number of wavelength values;
wherein the normalized first derivative values of the normalized reflectance curve of the target coating and the normalized first derivative values of the normalized reflectance curve of the sample coating, respectively, are represented, for each wavelength value as a two-dimensional vector according to the following formulas:

$$u_{\lambda_i} = \begin{pmatrix} k_1 \cdot \Delta \lambda_i \\ \Delta R_{ref,\lambda_i}^{norm} \end{pmatrix}$$

$$v_{\lambda_i} = \begin{pmatrix} k_1 \cdot \Delta \lambda_i \\ \Delta R_{smp,\lambda_i}^{norm} \end{pmatrix}$$

$$\theta_{\lambda_i} = \cos^{-1}\left(\frac{u_{\lambda_i} \cdot v_{\lambda_i}}{|u_{\lambda_i}| \cdot |v_{\lambda_i}|}\right)$$

with $$\Delta R_{ref,\lambda_i}^{norm} = R_{ref,\lambda_i+\Delta\lambda_i}^{norm} - R_{ref,\lambda_i}^{norm}, \text{ and}$$

$$\Delta R_{smp,\lambda_i}^{norm} = R_{smp,\lambda_i+\Delta\lambda_i}^{norm} - R_{smp,\lambda_i}^{norm}, \text{ and}$$

$$\Delta \lambda_i = \lambda_{i+1} - \lambda_i,$$

wherein $R_{ref,\lambda_i}^{norm}$ indicates a normalized reflectance value for the target coating at the wavelength value, $\lambda_i$, $R_{ref,\lambda_i+\Delta\lambda_i}^{norm}$ indicates a normalized reflectance value for the target coating at the wavelength value, $\lambda_{i+1}$, $R_{smp,\lambda_i}^{norm}$ indicates a normalized reflectance value for the sample coating at the wavelength value, $\lambda_i$, $R_{smp,\lambda_{i+1}}^{norm}$ indicates a normalized reflectance value for the sample coating smn2 at the wavelength value, $\lambda_{i+1}$, $k_1$ is a non-linear damping parameter with $k_1=0.005$ and $\theta_{\lambda_i}$ indicates the angle between the two normalized vectors $u_{\lambda_i}$ and $v_{\lambda_i}$, the vector $u_{\lambda_i}$ indicating a normalized gradient of the reflectance curve of the target coating at $\lambda_i$, and the vector $v_{\lambda_i}$ indicating a normalized gradient of the reflectance curve of the sample coating at $\lambda_i$.

9. The system according to claim 8, further comprising:
C) a color measuring device; and
D) a formulation database comprising formulas for coating compositions and interrelated colorimetric data;
wherein the computing device is functionally coupled to the color measuring device and the formulation database.

10. The system according to claim 8, wherein the computing process further comprises a matching process for matching the color of the target coating and the at least one sample coating, the matching process comprises at least the steps of:
B7) retrieving from the formulation database one or more preliminary matching formulas based on the sample colorimetric data; and
B8) selecting at least one from the one or more preliminary matching formulas so as to minimize the match metric beside other colorimetric metrics.

11. The system according to claim 8, wherein the computing process further comprises the step of:
  B9) modifying a formula for the sample coating so as to minimize the match metric beside other colorimetric metrics.

12. The method according to claim 2, the method further comprises the step of:
  i) modifying one of the one or more preliminary matching formulas retrieved from the database, so as to minimize the match metric for the similarity of the normalized reflectance curves of the target coating and the sample coating as an additional constraint beside existing color difference metric(s).

* * * * *

UNITED STATES PATENT AND TRADEMARK OFFICE
CERTIFICATE OF CORRECTION

PATENT NO. : 12,140,479 B2
APPLICATION NO. : 17/632801
DATED : November 12, 2024
INVENTOR(S) : Guido Bischoff et al.

It is certified that error appears in the above-identified patent and that said Letters Patent is hereby corrected as shown below:

In the Claims

In Claim 8, replace "with $R_{ref/smp,max} = R_{ref/smp,max}$" with --with $R_{ref/smp,max} = Max(R_{ref/smp,\lambda_i})$ --.

Signed and Sealed this
Seventh Day of October, 2025

John A. Squires
*Director of the United States Patent and Trademark Office*